US012466226B2

(12) United States Patent
Jeon et al.

(10) Patent No.: US 12,466,226 B2
(45) Date of Patent: Nov. 11, 2025

(54) SUSPENSION APPARATUS AND MANUFACTURING METHOD THEREOF

(71) Applicant: HYUNDAI MOBIS CO., LTD., Seoul (KR)

(72) Inventors: Jae Woong Jeon, Yongin-si (KR); Jin Wook Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/928,726

(22) Filed: Oct. 28, 2024

(65) Prior Publication Data

US 2025/0262900 A1    Aug. 21, 2025

(30) Foreign Application Priority Data

Feb. 16, 2024   (KR) .................. 10-2024-0022837
Mar. 27, 2024   (KR) .................. 10-2024-0041791

(51) Int. Cl.
  *B60G 7/00*   (2006.01)
  *B22D 19/04*  (2006.01)
  *B60G 3/20*   (2006.01)
  *B60G 7/02*   (2006.01)

(52) U.S. Cl.
  CPC ............ *B60G 7/008* (2013.01); *B22D 19/04* (2013.01); *B60G 7/02* (2013.01); *B60G 3/20* (2013.01); *B60G 2200/182* (2013.01); *B60G 2204/418* (2013.01); *B60G 2206/70* (2013.01); *B60G 2206/81012* (2013.01)

(58) Field of Classification Search
  CPC . B60G 7/008; B60G 7/02; B60G 3/20; B60G 2200/182; B60G 2204/418; B60G 2206/70; B60G 2206/81012; B22D 19/04
  See application file for complete search history.

(56) References Cited

U.S. PATENT DOCUMENTS

| | | | | |
|---|---|---|---|---|
| 4,790,560 | A * | 12/1988 | Asanuma ............ | B60G 15/062 |
| | | | | 280/124.128 |
| 7,431,315 | B2 * | 10/2008 | Jargowsky ............ | B60G 3/202 |
| | | | | 280/124.135 |
| 10,377,199 | B2 * | 8/2019 | Chung ................... | B60G 3/202 |
| 2008/0150249 | A1 * | 6/2008 | Murata ................... | B60G 3/14 |
| | | | | 280/124.128 |
| 2010/0084834 | A1 * | 4/2010 | Ersoy .................... | B60G 7/001 |
| | | | | 280/124.1 |

(Continued)

FOREIGN PATENT DOCUMENTS

| | | | | |
|---|---|---|---|---|
| KR | 10-2015-0066110 A | | 6/2015 | |
| KR | 20150066110 A | * | 6/2015 | ............... B60G 7/02 |

OTHER PUBLICATIONS

Translation of KR-20150066110-A.*

*Primary Examiner* — Paul N Dickson
*Assistant Examiner* — Shams Dhanani
(74) *Attorney, Agent, or Firm* — NSIP Law

(57) ABSTRACT

A suspension apparatus and a method therefor are provided. The suspension apparatus includes a body connector including a main body connector provided with a body connection hole, and a carrier including a carrier hole which extends from the body connector and into which a wheel bearing is inserted, a caliper connector connected to a caliper, and a link connector connected to a link and configured to rotate with respect to the body connection hole.

10 Claims, 27 Drawing Sheets

(56) References Cited

U.S. PATENT DOCUMENTS

| | | | |
|---|---|---|---|
| 2012/0315414 A1* | 12/2012 | Wesch | B62D 29/005 |
| | | | 428/34.1 |
| 2021/0031580 A1* | 2/2021 | Booth | B60G 3/26 |
| 2021/0188029 A1* | 6/2021 | Fink | B60G 7/008 |
| 2021/0229513 A1* | 7/2021 | Seethaler | B60G 7/02 |
| 2022/0266904 A1* | 8/2022 | Badino | F16C 33/586 |
| 2022/0297488 A1* | 9/2022 | Shimoda | B60G 3/14 |
| 2022/0297490 A1* | 9/2022 | Shimoda | B60G 7/02 |

* cited by examiner

SUSPENSION APPARATUS AND MANUFACTURING METHOD THEREOF

CROSS-REFERENCE TO RELATED APPLICATION

This application claims priority from and the benefit under 35 USC § 119 of Korean Patent Application No. 10-2024-0022837, filed on Feb. 16, 2024 and Korean Patent Application No. 10-2024-0041791, filed on Mar. 27, 2024, in the Korean Intellectual Property Office, the entire disclosures of which are hereby incorporated by reference for all purposes.

BACKGROUND

1. Field

Exemplary embodiments of the present disclosure relate to a suspension apparatus and a manufacturing method thereof, and more particularly, to a suspension apparatus and a manufacturing method thereof, which may reduce unsprung mass, tolerance, and production cost.

2. Description of the Related Art

As eco-friendly vehicles are in demand, hybrid or electric vehicles with motors and batteries installed therein are increasingly being used.

Due to the essential placement of batteries in the hybrid or electric vehicles, the hybrid vehicles or electric vehicles are heavier than typical internal combustion engine vehicles by an amount equal to the weight of the batteries. The increased weight of the vehicles requires the increased rigidity of suspensions. The increased rigidity of the suspensions requires the increased weight of the suspensions, which in turn increases unsprung mass, resulting in a decrease in ride comport of the vehicles. Thus, there is a need for various technologies that may reduce the unsprung mass to improve ride comport of the vehicles.

In addition, there is a need for technologies that may maintain the rigidity of the suspensions while reducing the unsprung mass.

The related art of the present disclosure is disclosed in Korean Patent Application Publication No. 10-2015-0066110 (published on Jun. 16, 2015 and entitled "STRUCTURE OF TRAILING-ARM").

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An objective of the present disclosure is to provide a suspension apparatus and a manufacturing method thereof, which may reduce unsprung mass.

In addition, an objective of the present disclosure is to provide a suspension apparatus and a manufacturing method thereof, which may minimize a tolerance.

In addition, an objective of the present disclosure is to provide a suspension apparatus and a manufacturing method thereof, which may increase rigidity.

In addition, an objective of the present disclosure is to provide a suspension apparatus and a manufacturing method thereof, which may maintain rigidity while reducing unsprung mass.

Furthermore, an objective of the present disclosure is to provide a suspension apparatus and a manufacturing method thereof, which may enhance the coupling strength between components.

In a general aspect of the disclosure, a suspension apparatus includes: a body connector including a main body connector provided with a body connection hole; and a carrier including: a carrier hole which extends from the body connector and into which a wheel bearing is inserted; a caliper connector connected to a caliper; and a link connector connected to a link and configured to rotate with respect to the body connection hole.

The link connector may include: a first link connector provided on an upper side of the carrier; a second link connector provided on one side of a lower side of the carrier; and a third link connector provided on the other side of the lower side of the carrier.

The link may include: a first link rotatively connected to the first link connector; a second link rotatively connected to the second link connector; and a third link rotatively connected to the third link connector.

The body connection hole may be provided on a first side of the main body connector, wherein the body connection insertion portion provided on a second side of the main body connector may be inserted into and secured in the carrier connector of the carrier.

The body connection insertion portion may include a recessed body latching portion, wherein the carrier may include a first carrier connection member inserted into the body latching portion.

The suspension apparatus may further include: a body connection insertion hole through which a first side of the body connection insertion portion and a second side of the body connection insertion portion are in communication with each other, wherein the carrier connector includes a second carrier connection member configured to penetrate the body connection insertion hole.

The body connector may include a first material, and the carrier may include a second material different from the first material.

In another general aspect of the disclosure, a suspension apparatus includes: a body connector including a main body connector provided with a body connection insertion portion, and a coupling reinforcement portion arranged on the body connection insertion portion; and a carrier including a carrier connector to which the body connection insertion portion is inserted and which comes into contact with the coupling reinforcement portion, a carrier hole into which a wheel bearing is inserted, a caliper connector connected to a caliper, and a link connector connected to a link.

The coupling reinforcement portion may include a first coupling reinforcement portion, which is formed on a surface of the body connection insertion portion and configured to enhance the coupling strength between the body connection insertion portion and the carrier connector.

The first coupling reinforcement portion may include a coupling reinforcement hole configured to receive the body connection insertion portion, wherein the carrier connector may include: a first carrier connection member configured to come in contact with the coupling reinforcement hole; and a second carrier connection member configured to penetrate the coupling reinforcement hole.

The first coupling reinforcement portion may include a coupling reinforcement burr penetrating the body connection insertion portion and protruding in one direction with respect to the body connection insertion portion, wherein the carrier connector may include: a first carrier connection member configured to come in contact with the coupling reinforcement burr; and a third carrier connection member configured to penetrate the coupling reinforcement burr.

The first coupling reinforcement portion may include a coupling reinforcement form device configured to protrude in one direction and be inclined with respect to the body connection insertion portion, wherein the carrier connector may include: a first carrier connection member configured to come in contact with the coupling reinforcement form device; and a second carrier connection member seated on the coupling reinforcement form device.

The first coupling reinforcement portion may include a coupling reinforcement form device hole configured to protrude in one direction and be inclined with respect to the body connection insertion portion, and provided with a hole, wherein the carrier connector may include: a first carrier connection member configured to come in contact with the coupling reinforcement form device hole; and a second carrier connection member configured to penetrate the coupling reinforcement form device hole.

The suspension apparatus may further include a second coupling reinforcement portion formed on an end of the body connection insertion portion to enhance the coupling strength between the body connection insertion portion and the carrier connector.

The second coupling reinforcement portion may include a coupling reinforcement flange extending from an end of the body connection insertion portion and configured to bend in one direction, wherein the carrier connector may include a first carrier connection member configured to surround the coupling reinforcement flange.

A manufacturing method of the suspension apparatus according to the present disclosure includes: an insertion step in which a body connector is arranged in a mold, wherein the body connector includes a main body connector provided with a body connection insertion portion and a coupling reinforcement portion arranged on the body connection insertion portion and includes a first material; and a casting step in which a carrier is manufactured by injecting a second material different from the first material into the mold, wherein the carrier includes: a carrier connector coming into contact with the body connection insertion portion; and a link connector connected to a link.

Prior to the insertion step, the manufacturing method may further include a step of forming the coupling reinforcement portion on the body connection insertion portion.

The step of forming the coupling reinforcement portion may include forming a first coupling reinforcement portion on a surface of the body connection insertion portion to enhance the coupling strength between the body connection insertion portion and the carrier connector.

The first coupling reinforcement portion may include a coupling reinforcement hole penetrating the body connection insertion portion.

The first coupling reinforcement portion may include a coupling reinforcement burr penetrating the body connection insertion portion and protruding in one direction with respect to the body connection insertion portion.

The first coupling reinforcement portion may include a coupling reinforcement form unit arranged to protrude in one direction and to be inclined with respect to the body connection insertion portion.

The first coupling reinforcement portion may include a coupling reinforcement form unit hole arranged to protrude in one direction and to be inclined with respect to the body connection insertion portion, and provided with a hole.

The step of forming the coupling reinforcement portion may include forming a second coupling reinforcement portion in an end of the body connection insertion portion to enhance the coupling strength between the body connection insertion portion and the carrier connector.

The second coupling reinforcement portion may include a coupling reinforcement flange extending from an end of the body connection insertion portion and bending in one direction.

The second coupling reinforcement portion may include a coupling reinforcement hem facing the body connection insertion portion by extending from an end of the body connection insertion portion and bending at the same.

The suspension apparatus and the manufacturing method thereof according to the present disclosure may reduce the weight of the suspension apparatus and improve ride comport of the vehicle.

In addition, the suspension apparatus and the manufacturing method thereof according to the present disclosure may minimize a tolerance occurring in the suspension apparatus.

In addition, the suspension apparatus and the manufacturing method thereof according to the present disclosure may increase the rigidity of the suspension apparatus.

In addition, the suspension apparatus and the manufacturing method thereof according to the present disclosure may lower the manufacturing cost.

In addition, the suspension apparatus and the manufacturing method thereof according to the present disclosure may maintain the rigidity of the suspension apparatus while reducing the weight thereof.

DETAILED DESCRIPTION

Figure 1:
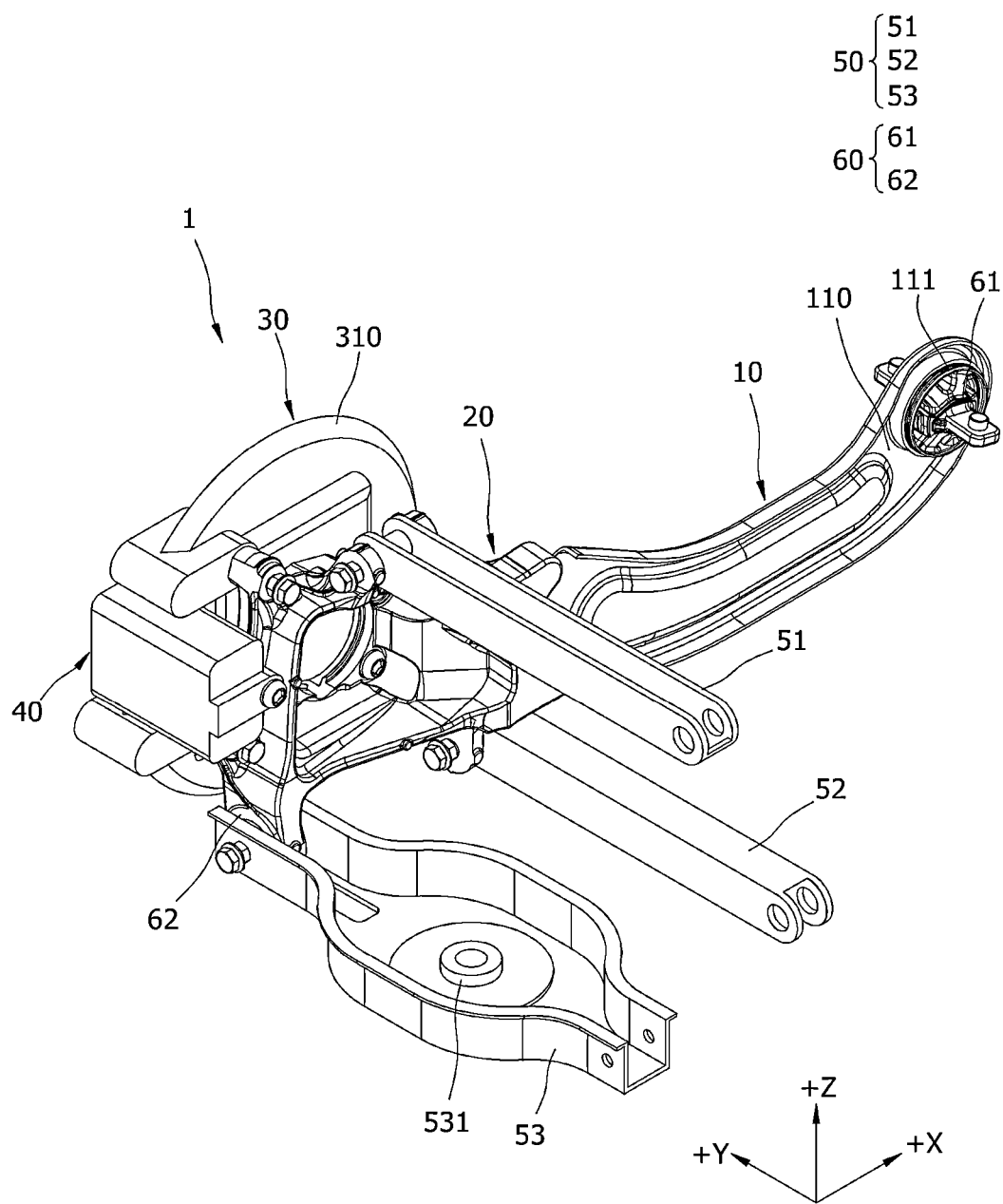
FIG. 1 is a perspective view illustrating a suspension apparatus according to an embodiment of the present disclosure, when viewed from one side.

Exemplary embodiments of a suspension apparatus and a manufacturing method thereof will be described below with reference to the accompanying drawings. It should be considered that the thickness of each line or the size of each component in the drawings may be exaggeratedly illustrated for clarity and convenience of description. In addition, the terms as used herein are defined in consideration of functions of the present disclosure, and these terms may change depending on a user or operator's intention or practice. Therefore, definitions of these terms will have to be made based on the content herein.

Figure 2:
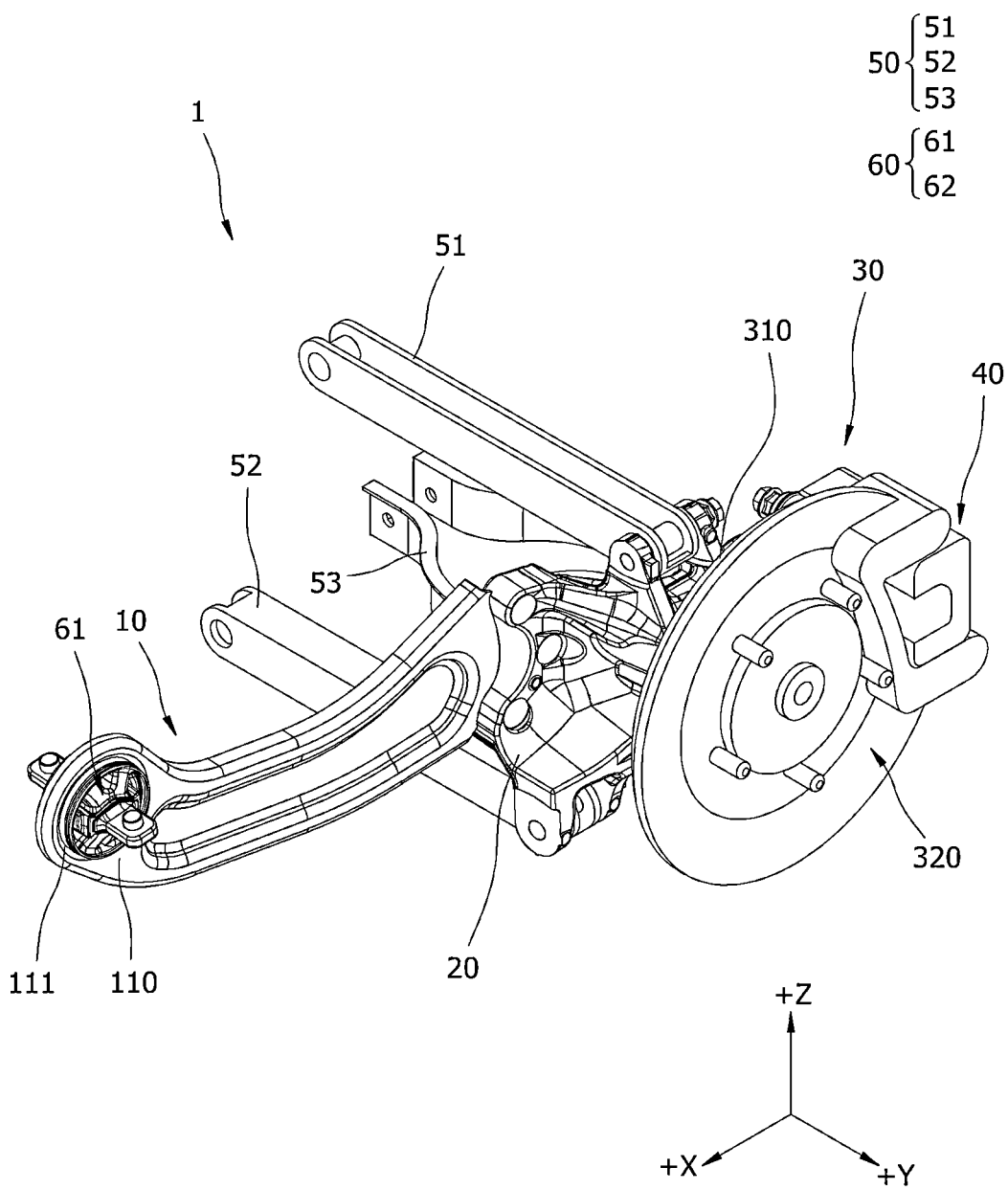
FIG. 2 is a perspective view illustrating the suspension apparatus according to an embodiment of the present disclosure, when viewed from the other side.

FIG. 1 is a perspective view illustrating a suspension apparatus according to an embodiment of the present disclosure, when viewed from one side. FIG. 2 is a perspective view illustrating the suspension apparatus according to an embodiment of the present disclosure, when viewed from the other side.

FIGS. 1 and 2 illustrate a suspension apparatus 1. The suspension apparatus may include a body connector 10, a carrier 20, a disk 30, a caliper 40, a link 50, and a bush 60.

The body connector 10 may be arranged between a body (not illustrated) of a vehicle and the carrier 20 to connect the body (not illustrated) and the carrier 20.

The body connector 10 may include a main body connector 110. The main body connector 110 may be provided with a body connection hole 111. According to an embodiment, the body connection hole 111 may be provided on one end of the main body connector 110. The body connection hole 111 may enable one side (e.g., the +Y-axis direction) and the other side (e.g., the −Y-axis direction) of the main body connector 110 to communicate with each other. The bush 60 may be arranged in the body connection hole 111. According to an embodiment, a body connection bush 61 may be arranged in the body connection hole 111. The body connection bush 61 may be inserted into the body connection hole 111. The main body connector 110 and the body may be connected through the body connection bush 61. Since the body connection bush 61 is arranged in the body connection hole 111 to connect the body and the main body connector 110, the main body connector 110 may rotate with respect to the body connection bush 61 arranged in the body connection hole 111, and the carrier 20 connected to the main body connector 110 may also rotate with respect to the body connection bush 61. Accordingly, the carrier 20 may move relative to the body.

The main body connector 110 may be inserted into the carrier 20 and secured to the carrier 20. Since the main body connector 110 is inserted into and secured to the carrier 20, the main body connector 110 and the carrier 20 may be integrally formed and movable. Since the main body connector 110 is inserted into the carrier 20 and formed integrally with the same, a coupling member (e.g., bolt, nut, etc.) connecting the body connector 10 and the carrier 20 may not be used.

Since the coupling member is not used, the unsprung mass of the suspension apparatus 1 may be reduced by the mass of the coupling member, and ride comport of the vehicle may be improved.

In addition, since the coupling member is not used, a tolerance between the body connector 10 and the carrier 20 may be reduced.

Furthermore, since a process for coupling the body connector 10 and the carrier 20 is not required, the manufacturing process may be simplified and the unit cost of the suspension apparatus 1 may decrease.

The carrier 20 may be connected to the disk 30, the caliper 40, and the link 50.

The disk 30 may be arranged on one side of the carrier 20 (e.g., the +Y-axis direction). The disk 30 may include a disk cover 310 and a disk rotor 320. The disk cover 310 may be arranged between the carrier 20 and the disk rotor 320. The disk rotor 320 may rotate with respect to the carrier 20, and the disk cover 310 may be secured to the carrier 20.

The caliper 40 may be arranged to be connected to the carrier 20. A portion of the caliper 40 may be secured to the carrier 20 and move to come into contact with the disk rotor 320 of the disk 30. When the caliper 40 moves to come into contact with the disk rotor 320 rotating with respect to the carrier 20, friction generated between the caliper 40 and the disk rotor 320 may reduce a rotational speed of the disk rotor 320 or stop the rotation of the disk rotor 320.

The link 50 may be arranged to be connected to the carrier 20. One end of the link 50 may be connected to the carrier 20, and the other end thereof may be connected to the body. The link 50 may rotate with respect to the carrier 20 and the body. Since the link 50 rotates with respect to the carrier 20 and the body, the carrier 20 may move relative to the body. The link 50 may include a first link 51, a second link 52, and a third link 53.

The first link 51 may be arranged on an upper side (e.g., the +Z-axis direction) of the carrier 20. The second link 52 may be arranged on one portion (e.g., the +X-axis direction) of a lower side (e.g., the −Z-axis direction) of the carrier 20. The third link 53 may be arranged on another portion (e.g., the −X axis direction) of the lower side (e.g., the −Z axis direction) of the carrier 20.

The first link 51, the second link 52, and the third link 53 may be connected to the carrier 20 and rotate with respect to the carrier 20. According to an embodiment, one end of the first link 51, one end of the second link 52, and one end of the third link 53 may be connected to the carrier 20 and rotate with respect to the carrier 20, and the other end of the first link 51, the other end of the second link 52, and the other end of the third link 53 may be connected to the body and rotate with respect to the body. Since the first link 51, the second link 52, and the third link 53 rotate with respect to the carrier 20 and the body, the carrier 20 may move relative to the body.

The third link 53 may include an elastic support part 531. The elastic support part 531 may be arranged between the one end and the other end of the third link 53. An elastic element may be arranged on the elastic support part 531, and the elastic element may be arranged to connect the third link 53 and a portion of the body. According to an embodiment, the elastic element may be provided as a spring. Since the elastic element connects the third link 53 and the portion of the body, the distance between the portion of the body and the third link 53 may change.

Figure 3:
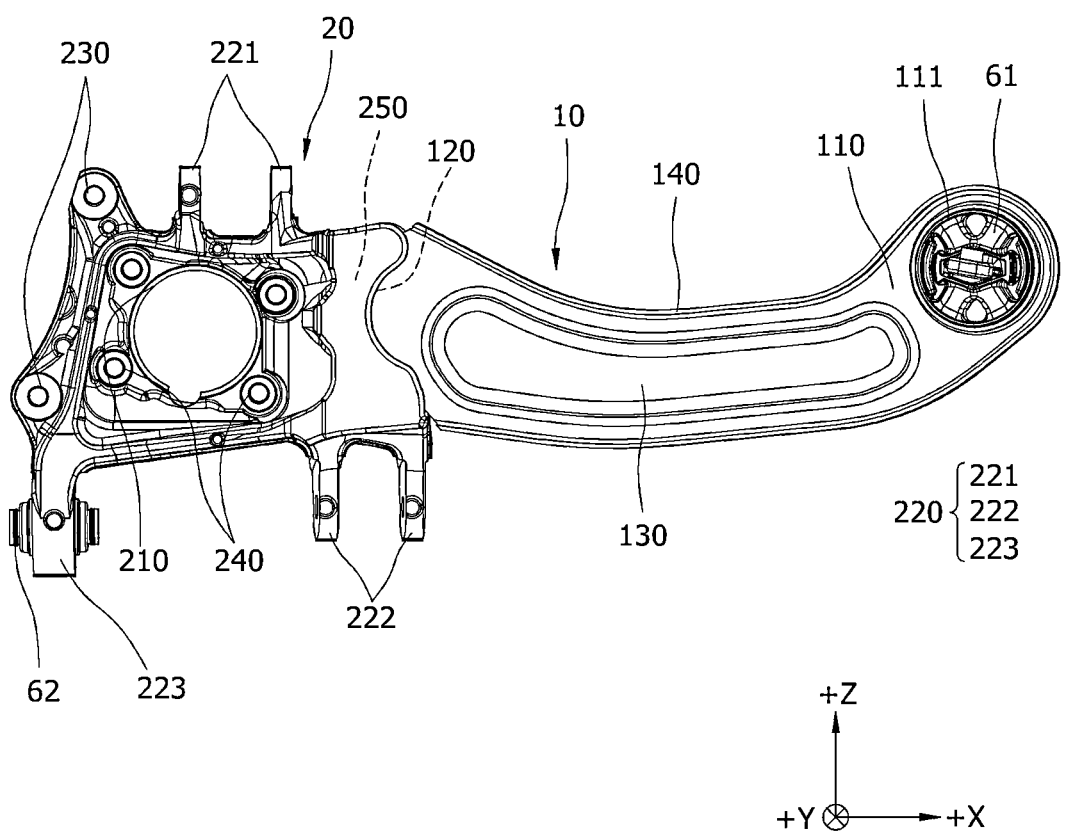
FIG. 3 is a plan view illustrating a portion of the suspension apparatus according to an embodiment of the present disclosure.
Figure 4:
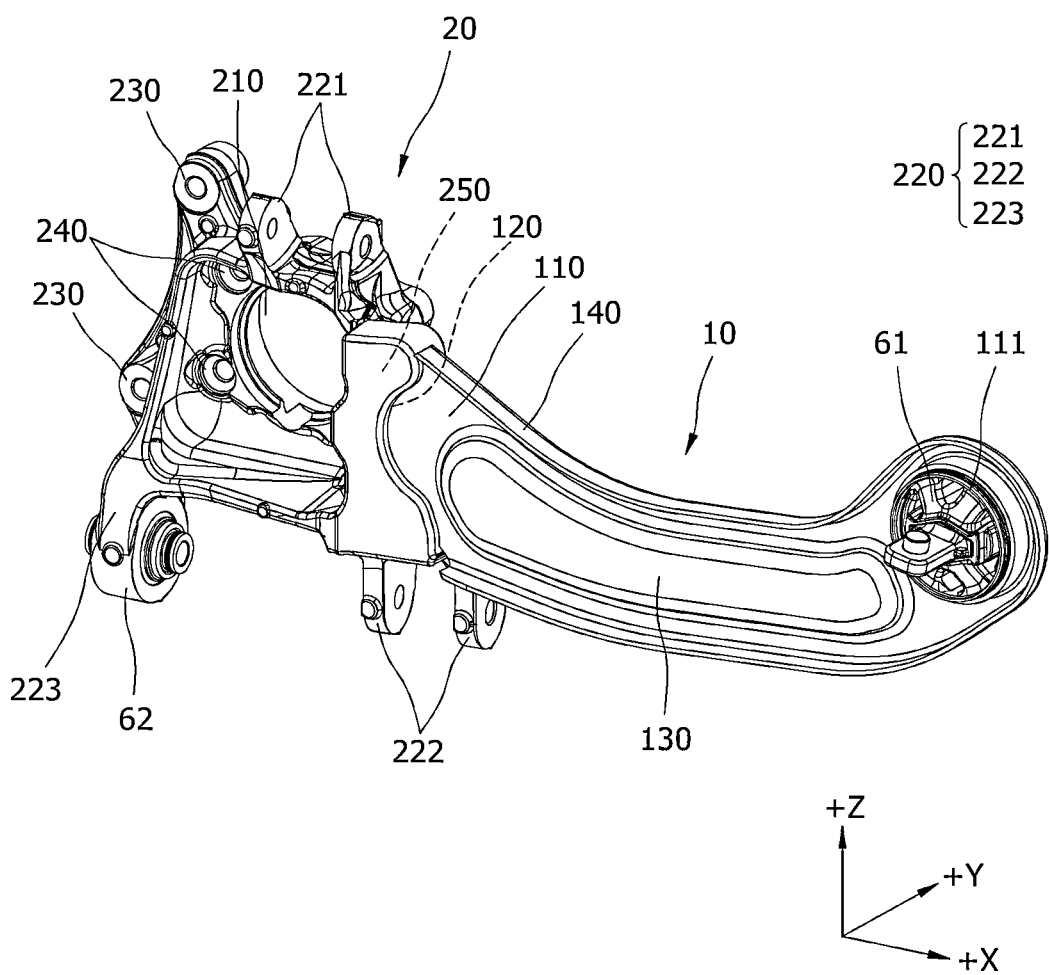
FIG. 4 is a perspective view illustrating the portion of the suspension apparatus according to an embodiment of the present disclosure, when viewed from one side.
Figure 5:
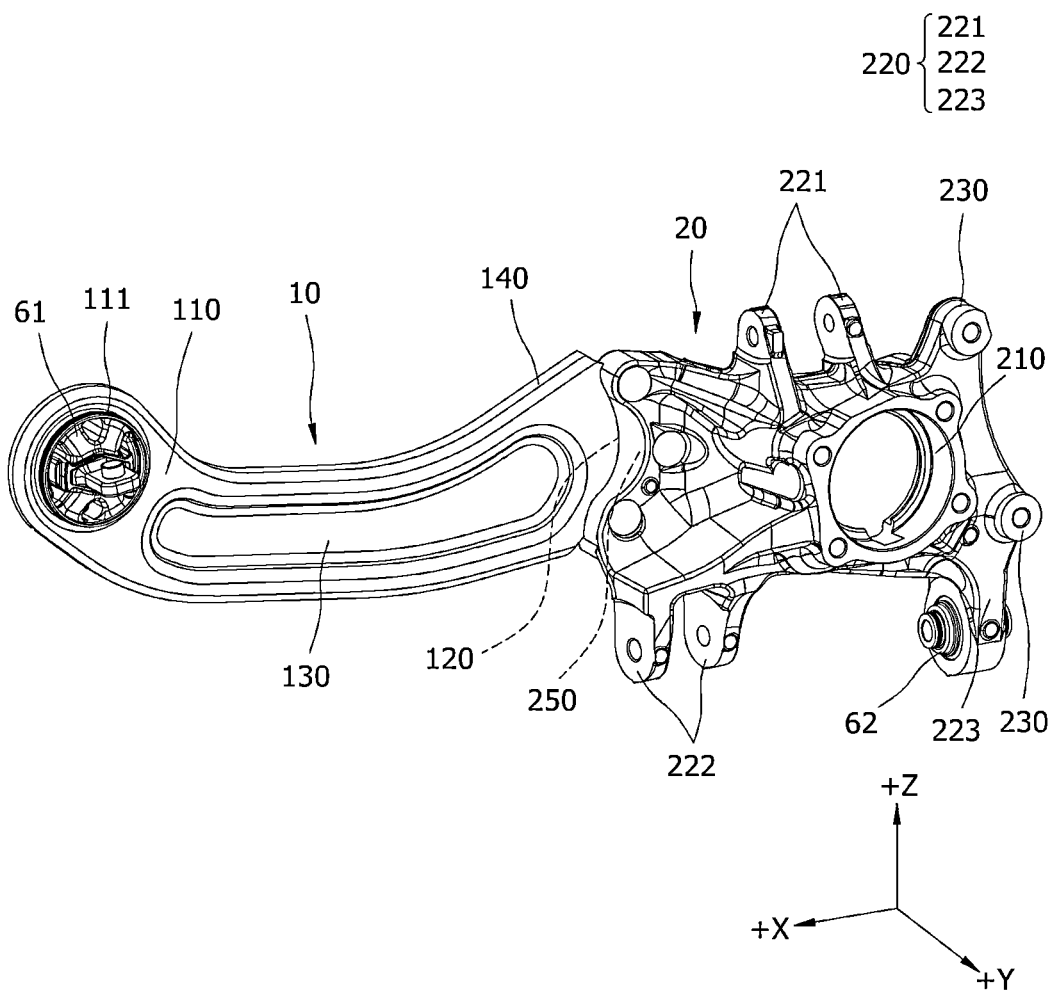
FIG. 5 is a perspective view illustrating the portion of the suspension apparatus according to an embodiment of the present disclosure, when viewed from the other side.
Figure 6:
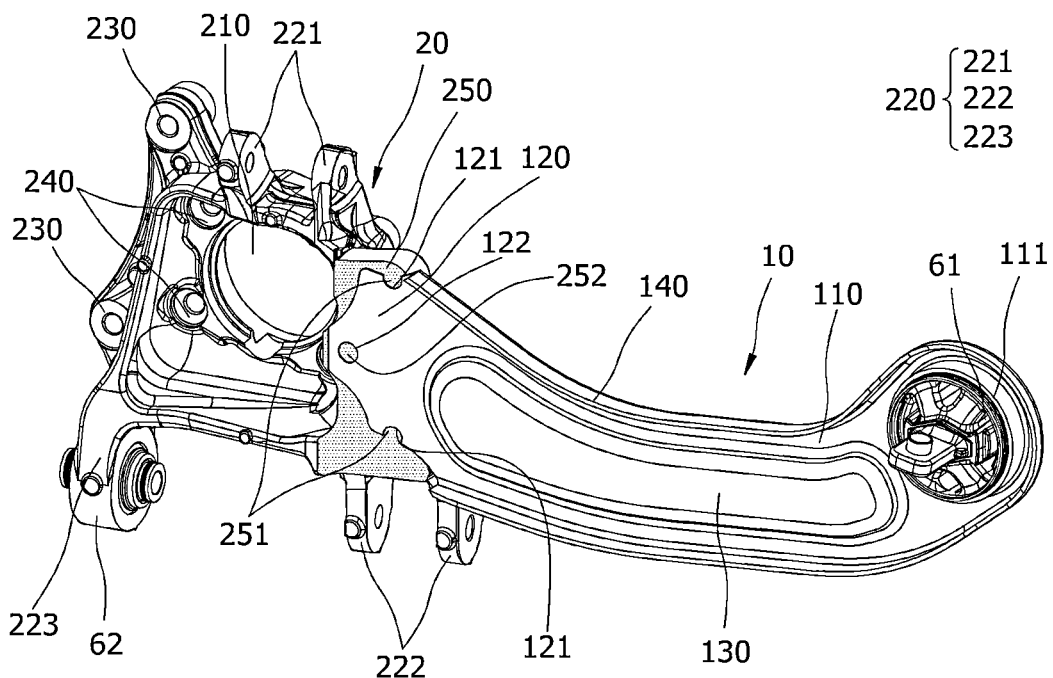
FIG. 6 is an enlarged perspective view illustrating the portion of the suspension apparatus according to an embodiment of the present disclosure.
Figure 7:
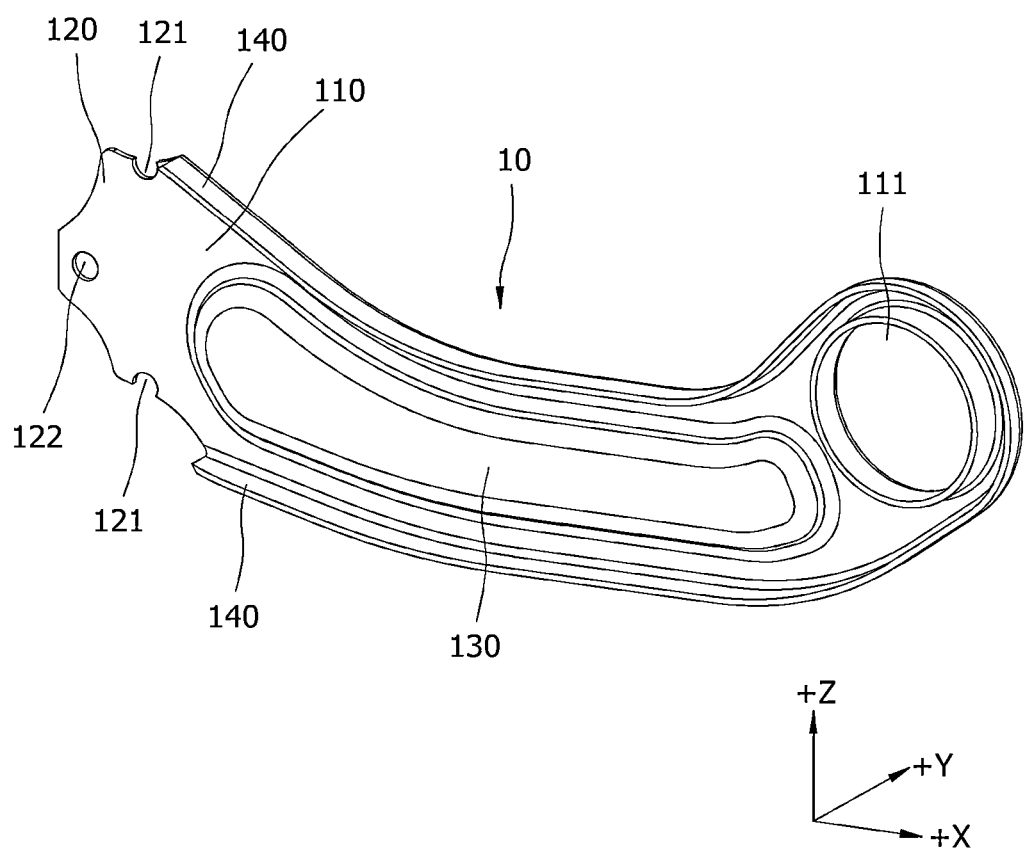
FIG. 7 is a perspective view illustrating a body connector of the suspension apparatus according to an embodiment of the present disclosure, when viewed from one side.
Figure 8:
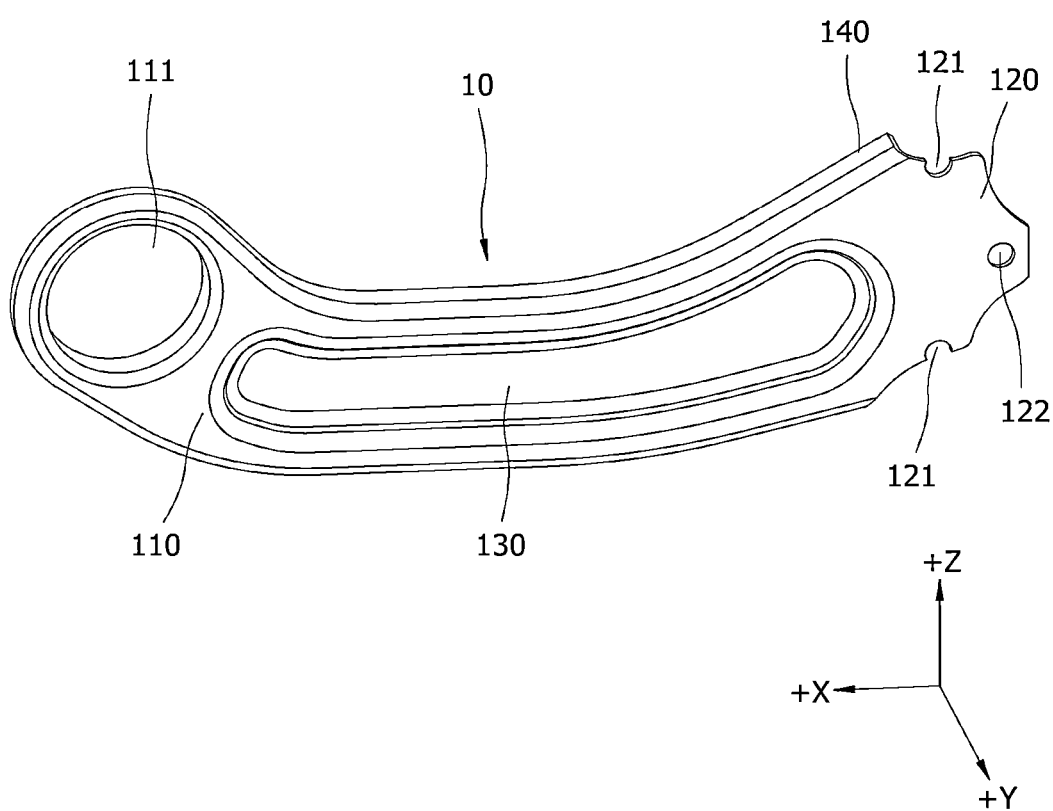
FIG. 8 is a perspective view illustrating the body connector of the suspension apparatus according to an embodiment of the present disclosure, when viewed from the other side.

FIG. 3 is a plan view illustrating a portion of the suspension apparatus according to an embodiment of the present disclosure. FIG. 4 is a perspective view illustrating the portion of the suspension apparatus according to an embodiment of the present disclosure, when viewed from one side. FIG. 5 is a perspective view illustrating the portion of the suspension apparatus according to an embodiment of the present disclosure, when viewed from the other side. FIG. 6 is an enlarged perspective view illustrating the portion of the suspension apparatus according to an embodiment of the present disclosure. FIG. 7 is a perspective view illustrating a body connector of the suspension apparatus according to an embodiment of the present disclosure, when viewed from one side. FIG. 8 is a perspective view illustrating the body connector of the suspension apparatus according to an embodiment of the present disclosure, when viewed from the other side.

The suspension apparatus 1, the body connector 10, the main body connector 110, the body connection hole 111, the carrier 20, the bush 60, the body connection bush 61, and a third link connection bush 62 illustrated in FIGS. 3 to 8 are the same as the suspension apparatus 1, the body connector 10, the main body connector 110, the body connection hole 111, the carrier 20, the bush 60, the body connection bush 61, and the third link connection bush 62 illustrated in FIGS. 1 and 2. Thus, the description of the same configuration may be omitted.

Referring to FIGS. 3 to 8, a detailed structure of the body connector 10 and the carrier 20 may be seen.

The body connector 10 may include a main body connector 110, a body connection insertion portion 120, a body recess portion 130, and a body bend portion 140.

The main body connector 110 may include the body connection hole 111. The body connection hole 111 may enable one side (e.g., the +Y-axis direction) and the other side (e.g., the −Y-axis direction) of the main body connector 110 to communicate with each other. According to an embodiment, the body connection hole 111 may be provided on one end of the main body connector 110, and the body connection insertion portion 120 may be provided on the other end of the main body connector 110.

The bush 60 may be arranged in the body connection hole 111. According to an embodiment, the body connection bush 61 may be arranged in the body connection hole 111. The body connection bush 61 may be inserted into the body connection hole 111, and may be connected to the body. The body connection bush 61 may be provided as an elastic element. Since the body connection bush 61 is inserted into the body connection hole 111 and connected to the body, the main body connector 110 provided with the body connection hole 111 may rotate with respect to the body.

The body connection insertion portion 120 may be provided in the main body connector 110 to come into contact with the carrier 20. The body connection insert 120 may be defined as a portion of the main body connector 110 coming into contact with the carrier 20. According to an embodiment, the body connection insertion portion 120 may be inserted into the carrier 20 such that the body connector 10 and the carrier 20 may be integrally provided. Since the body connector 10 and the carrier 20 are integrally provided, the coupling member connecting the body connector 10 and the carrier 20 may not be used.

The body connection insertion portion 120 may be provided with a body latching portion 121 and a body connection insertion hole 122.

The body latching portion 121 may be provided to have a step toward a center (e.g., the Z-axis direction) of the main body connector 110.

According to an embodiment, the body latching portion 121 may be provided to be recessed. The body latching portion 121 may be provided to be recessed in the main body connector 110, and the carrier 20 may be inserted into the body latching portion 121.

According to an embodiment, the body latching portion 121 may be provided to protrude from the main body connector 110. The body latching portion 121 may be provided to protrude from the main body connector 110, and the body latching portion 121 may be inserted into the carrier 20.

As the carrier 20 is inserted into the body latching portion 121 or the body latching portion 121 is inserted into the carrier 20, the coupling strength between the body connector 10 and the carrier 20 may increase. In addition, there may be no clearance between the body connector 10 and the carrier 20.

The body connection insertion hole 122 may enable one side (e.g., the +Y-axis direction) and the other side (e.g., the −Y-axis direction) of the main body connector 110 to communicate with each other. One or more body connection insertion holes 122 may be provided. Since the body connection insertion hole 122 is provided in the main body connector 110, the carrier 20 may be arranged to penetrate the body connection insertion hole 122. Since the carrier 20 is arranged to penetrate the body connection insertion hole 122, the coupling strength between the body connector 10 and the carrier 20 may increase. In addition, there may be no clearance between the body connector 10 and the carrier 20.

The body recess portion 130 may be provided in the main body connector 110, and formed to be recessed toward one side (e.g., the −Y-axis direction). One or more body recess portions 130 may be provided in the main body connector 110. The body recess portion 130 may be arranged in a central portion of the main body connector 110. The location where the body recess portion 130 is arranged is not limited to the central portion of the main body connector 110, but the body recess portion 130 may be arranged at various locations. Since the body recess portion 130 is provided in the main body connector 110, the flexural rigidity of the body connector 10 may increase.

The body bend portion 140 may be provided in the main body connector 110 and bend toward one side (e.g., the −Y-axis direction). The body bend portion 140 may be provided in an outer portion of the main body connector 110. Since the body bend portion 140 is provided in the main body connector 110, the flexural rigidity of the body connector 10 may increase.

The carrier 20 may include a carrier hole 210, a link connector 220, a caliper connector 230, a disk connector 240, and a carrier connector 250.

The carrier 20 may be provided with the carrier hole 210. The carrier hole 210 may enable one side (e.g., the +Y-axis direction) and the other side (e.g., the −Y-axis direction) of the carrier 20 to communicate with each other. The disk 30 may be inserted into the carrier hole 210. The disk 30 may be inserted into the carrier hole 210 and secured to the carrier 20.

The carrier 20 may be provided with the link connector 220. The link connector 220 may connect the carrier 20 and the link 50. The link 50 may be provided to be connected to the carrier 20 through the link connector 220 and rotate with respect to the carrier 20. The link connector 220 may include a first link connector 221, a second link connector 222, and a third link connector 223.

The first link connector 221 may be provided in the carrier 20. According to an embodiment, the first link connector 221 may be provided on an upper side (e.g., the +Z-axis direction) of the carrier 20. The first link connector 221 may be provided with a hole into which the first link 51 may be inserted. The first link connector 221 may be connected to the first link 51, and the first link 51 may rotate with respect to the carrier 20 by being connected to the first link connector 221.

The second link connector 222 may be provided in the carrier 20. According to an embodiment, the second link connector 222 may be provided on one side (e.g., the +X-axis direction) of a lower side (e.g., the −Z-axis direction) of the carrier 20. The second link connector 222 may be provided with a hole into which the second link 52 may be inserted. The second link connector 222 may be connected to the second link 52, and the second link 52 may rotate with respect to the carrier 20 by being connected to the second link connector 222.

The third link connector 223 may be provided in the carrier 20. According to an embodiment, the third link connector 223 may be provided on the other side (e.g., the −X-axis direction) of the lower side (e.g., the −Z-axis direction) of the carrier 20. The third link connector 223 may be provided with a hole into which the third link 53 may be inserted. The third link connector 223 may be connected to the third link 53, and the third link 53 may rotate with respect to the carrier 20 by being connected to the third link connector 223.

The link connector 220 may be provided with the bush 60. According to an embodiment, the third link connector 223 may be provided with the third link connection bush 62. The third link connection bush 62 may be connected to the third link 53. The third link 53 may rotate with respect to the carrier 20 by being connected to the third link connection bush 62.

The caliper connector 230 may be provided in the carrier 20. The caliper 40 may be connected to the caliper connector 230. According to an embodiment, the caliper 40 may be secured to the caliper connector 230, and the caliper 40, while moving relative to the disk rotor 320 of the disk 30, may come into contact with and rub against the disk rotor 320 or become spaced apart from the disk rotor 320. Since the caliper 40 rubs against the disk 30, rotation of the disk 30 may slow down or stop.

The disk connector 240 may be provided in the carrier 20. The disk connector 240 may be arranged adjacent to the body connection hole 111. The disk connector 240 may be provided as a hole penetrating the carrier 20. The disk connector 240 may be provided as one or more holes. The disk connector 240 may be connected to the disk 30. According to an embodiment, a portion of the disk 30 may be secured to the carrier 20 by penetrating the disk connector 240.

The carrier connector 250 may be provided in the carrier 20. The carrier connector 250 may be connected to the body connector 10. According to an embodiment, the body connector 10 may be inserted into the carrier connector 250. A first carrier connection member 251 provided in the carrier connector 250 may be arranged in the body latching portion 121 of the body connector 10. The first carrier connection member 251 may be inserted into the body latching portion 121.

A second carrier connection member 252 provided in the carrier connector 250 may be arranged in the body connection insertion hole 122 of the body connector 10. The second carrier connection member 252 may be inserted into the body connection insertion hole 122. According to an embodiment, the second carrier connection member 252 may penetrate the body connection insertion hole 122. Since the first carrier connection member 251 is arranged in the body latching portion 121 and the second carrier connection member 252 is arranged in the body connection insertion hole 122, the coupling strength between the body connector 10 and the carrier 20 may increase. In addition, a clearance between the body connector 10 and the carrier 20 may decrease.

The body connector 10 may be made of a material including a first material. According to an embodiment, the first material may be provided as a material including at least one of iron, iron alloy, carbon fiber, and plastic, or a combination thereof.

The carrier 20 may be made of a material including a second material different from the first material. According to an embodiment, the second material may be provided as a material including at least one of aluminum, aluminum alloy, carbon fiber, and plastic, or a combination thereof.

With the body connector 10 provided, the carrier 20 integrally connected to the body connector 10 may be manufactured. Hereinafter, a manufacturing method of the suspension apparatus 1 provided with the body connector 10 and the carrier 20 will be described.

Figure 9:
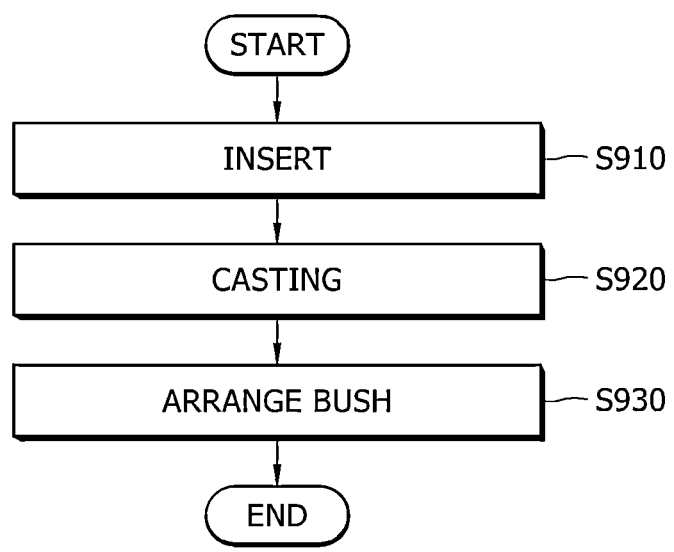
FIG. 9 is a flowchart illustrating a manufacturing method of the suspension apparatus according to an embodiment of the present disclosure.
Figure 10:
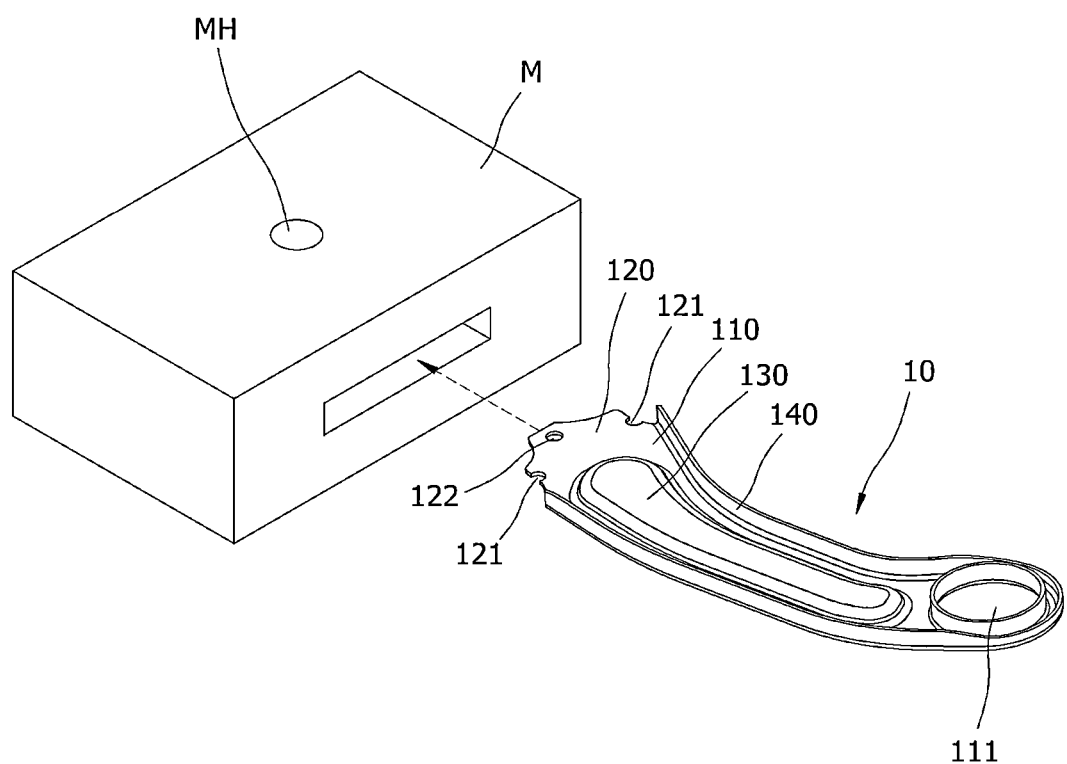
FIG. 10 is a perspective view illustrating an insertion of the body connector of the suspension apparatus into a mold according to an embodiment of the present disclosure.

FIG. 9 is a flowchart illustrating a manufacturing method of the suspension apparatus according to an embodiment of the present disclosure. FIG. 10 is a perspective view illustrating an insertion of the body connector of the suspension apparatus into a mold according to an embodiment of the present disclosure.

The body connector 10, the main body connector 110, the body connection hole 111, the body connection insertion portion 120, the body latching portion 121, the body connection insertion hole 122, the body recess portion 130, the body bend portion 140, and the carrier 20 used in the description of FIGS. 9 and 10 are the same as the body connector 10, the main body connector 110, the body connection hole 111, the body connection insertion portion 120, the body latching portion 121, the body connection insertion hole 122, the body recess portion 130, the body bend portion 140, and the carrier 20 illustrated in FIGS. 1 to 8. Thus, the description of the same configuration may be omitted.

Referring to FIGS. 9 and 10, the manufacturing method of the suspension apparatus 1 may include an insertion step in which the body connector 10 is arranged in a mold M (S910 in FIG. 9). The body connector 10 may be made of a material including the first material. The body connection insertion portion 120 of the body connector 10 may be inserted into the mold M. Since the body connection insertion portion 120 is inserted into the mold M, the body connection insertion portion 120 may come into contact with a material including the second material in a casting step (S920 in FIG. 9), which will be described below.

The manufacturing method of the suspension apparatus 1 may include the casting step in which the material including the second material is disposed in the mold M to form the carrier 20 (S920 in FIG. 9). The material including the second material may be injected into the mold M through a mold hole MH of the mold M. The first material of the body connector 10 and the second material of the carrier 20 may be different from each other. The mold M may be provided to correspond to a shape of the carrier 20.

In the casting step (S920), the body connection insertion portion 120 provided in the body connector 10 may be connected to the carrier connector 250 of the carrier 20. According to an embodiment, the body connection insertion portion 120 may be inserted into the carrier connector 250. When the body connection insertion portion 120 is inserted into the carrier connector 250, the coupling strength may be generated between the body connection insertion portion 120 and the carrier connector 250 such that the body connector 10 and the carrier 20 may be integrally formed. Since the body connector 10 and the carrier 20 may be integrally formed, the coupling member (e.g., bolt, nut, etc.) coupling the body connector 10 and the carrier 20 may not be used. Thus, the mass of the suspension apparatus 1 may be reduced, and a process for coupling the body connector 10 and the carrier 20 is not required, thereby lowering manufacturing cost of the suspension apparatus 1.

The body connection insertion portion 120 may include the body latching portion 121 and the body connection insertion hole 122.

The body latching portion 121 may be provided in a concave shape that is recessed toward a central portion of the main body connector 110. In the casting step (S920), the material including the second material may be disposed in the body latching portion 121, and accordingly, the first carrier connection member 251 of the carrier 20 may be arranged in the body latching portion 121. As the first carrier connection member 251 is arranged in the body latching portion 121, the coupling strength between the body connector 10 and the carrier 20 may increase, and a tolerance between the body connector 10 and the carrier 20 may be reduced.

The body connection insertion hole 122 may be provided as a hole through which one side and the other side of the main body connector 110 are in communication with each other. In the casting step (S920), the material including the second material may be disposed in the body connection insertion hole 122, and accordingly, the second carrier connection member 252 of the carrier 20 may be arranged in body connection insertion hole 122. According to an embodiment, the second carrier connection member 252 may penetrate the body connection insertion hole 122. Since the second carrier connection member 252 penetrates the body connection insertion hole 122, the coupling strength between the body connector 10 and the carrier 20 may increase, and a tolerance between the body connector 10 and the carrier 20 may be reduced.

The manufacturing method of the suspension apparatus 1 may include a bush arrangement step in which the bush 60 is arranged in the suspension apparatus 1 (S930 in FIG. 9). The bush 60 may include the body connection bush 61 and the third link connection bush 62.

The bush arrangement step (S930) may include arranging the body connection bush 61 in the body connection hole 111. According to an embodiment, the bush arrangement step (S930) may include inserting the body connection bush 61 into the body connection hole 111.

The bush arrangement step (S930) may include arranging the third link connection bush 62 in the third link connector 223. According to an embodiment, the bush arrangement step (S930) may include inserting the third link connection bush 62 into the third link connector 223.

The suspension apparatus 1 manufactured by the manufacturing method of the suspension apparatus may be made lightweight, thereby improving ride comport. In addition, a tolerance occurring in the suspension apparatus 1 may be minimized, and rigidity may increase. Furthermore, the manufacturing cost of the suspension apparatus 1 may be lowered.

Figure 11:
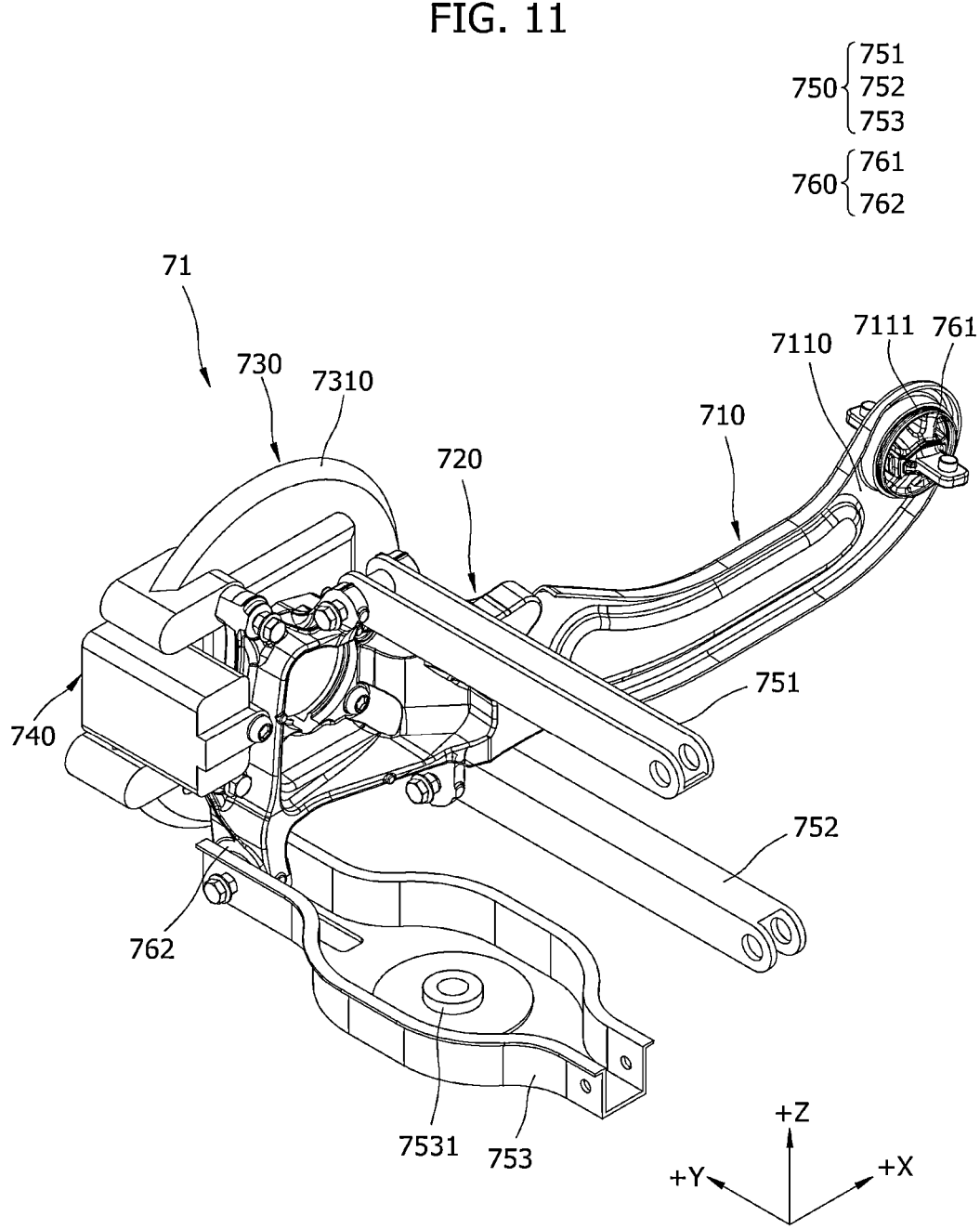
FIG. 11 is a perspective view illustrating a suspension apparatus according to an embodiment of the present disclosure, when viewed from one side.
Figure 12:
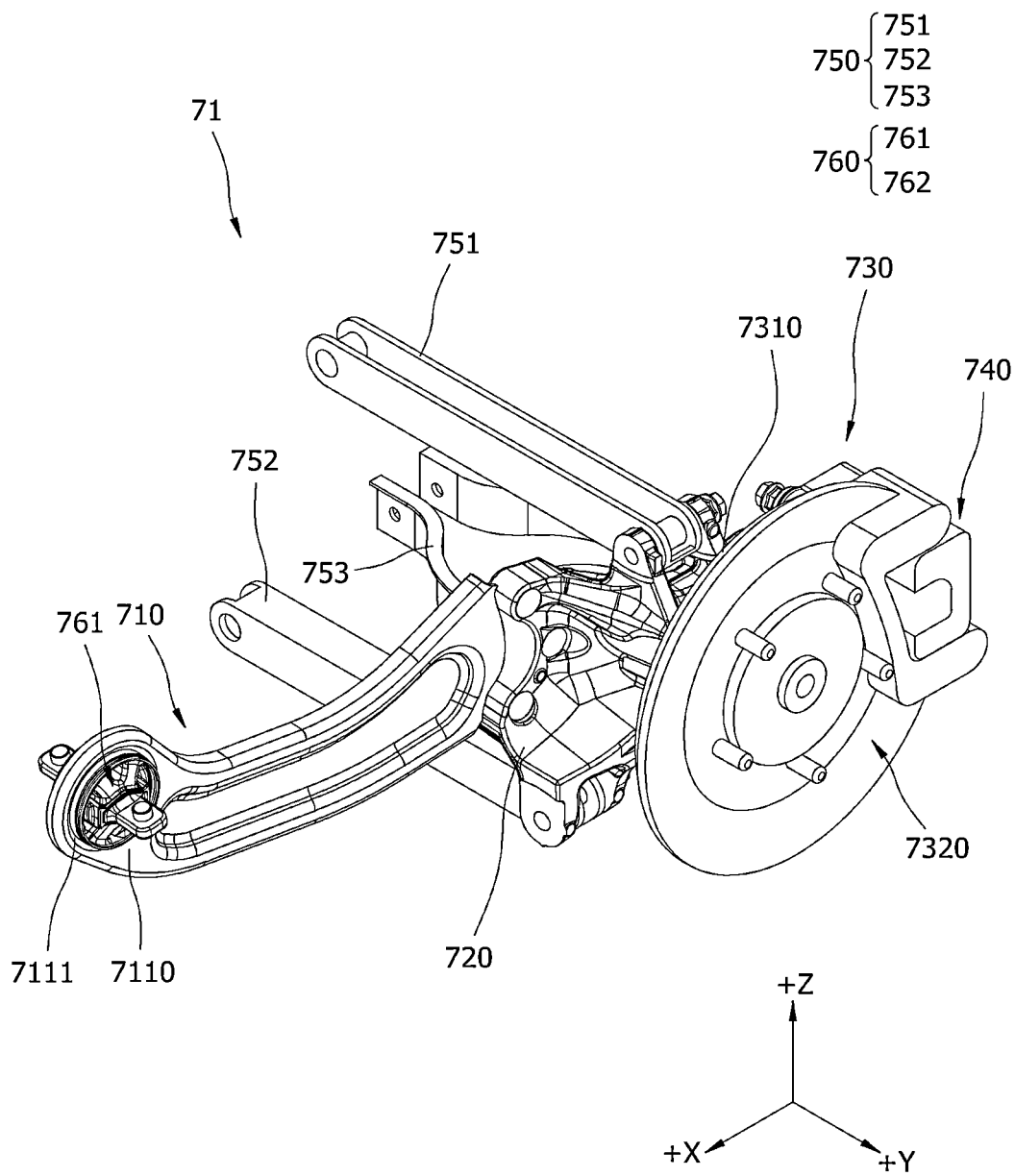
FIG. 12 is a perspective view illustrating the suspension apparatus according to an embodiment of the present disclosure, when viewed from the other side.

FIG. 11 is a perspective view illustrating a suspension apparatus according to an embodiment of the present disclosure, when viewed from one side. FIG. 12 is a perspective view illustrating the suspension apparatus according to an embodiment of the present disclosure, when viewed from the other side.

FIGS. 11 and 12 illustrate a suspension apparatus 71. The suspension apparatus 71 may include a body connector 710, a carrier 720, a disk 730, a caliper 740, a link 750, and a bush 760.

The body connector 710 may be arranged between a body (not illustrated) of a vehicle and the carrier 720 to connect the body (not illustrated) and the carrier 720.

The body connector 710 may include a main body connector 7110. The main body connector 7110 may be provided with a body connection hole 7111. According to an embodiment, the body connection hole 7111 may be provided on one end of the main body connector 7110. The body connection hole 7111 may enable one side (e.g., the +Y-axis direction) and the other side (e.g., the −Y-axis direction) of the main body connector 7110 to communicate with each other. The bush 760 may be arranged in the body connection hole 7111. According to an embodiment, a body connection bush 761 may be arranged in the body connection hole 7111. The body connection bush 761 may be inserted into the body connection hole 7111. The main body connector 7110 and the body may be connected through the body connection bush 761. Since the body connection bush 761 is arranged in the body connection hole 7111 to connect the body and the main body connector 7110, the main body connector 7110 may rotate with respect to the body connection bush 761 arranged in the body connection hole 7111, and the carrier 720 connected to the main body connector 7110 may also rotate with respect to the body connection bush 761. Accordingly, the carrier 720 may move relative to the body.

The main body connector 7110 may be inserted into the carrier 720 and secured to the carrier 720. Since the main body connector 7110 is inserted into and secured to the carrier 720, the main body connector 7110 and the carrier 720 may be integrally formed and movable. Since the main body connector 7110 is inserted into the carrier 720 and formed integrally with the same, a coupling member (e.g., bolt, nut, etc.) connecting the body connector 710 and the carrier 720 may not be used.

Since the coupling member is not used, the unsprung mass of the suspension apparatus 71 may be reduced by the mass of the coupling member, and ride comport of the vehicle may be improved.

In addition, since the coupling member is not used, a tolerance between the body connector 710 and the carrier 720 may be reduced.

Furthermore, since a process for coupling the body connector 710 and the carrier 720 is not required, the manufacturing process may be simplified, and the unit cost of the suspension apparatus 71 may decrease.

The carrier 720 may be connected to the disk 730, the caliper 740, the link 750.

The disk 730 may be arranged on one side of the carrier 720 (e.g., the +Y-axis direction). The disk 730 may include a disk cover 7310 and a disk rotor 7320. The disk cover 7310 may be arranged between the carrier 720 and the disk rotor 7320. The disk rotor 7320 may rotate with respect to the carrier 720, and the disk cover 7310 may be secured to the carrier 720.

The caliper 740 may be disposed to be connected to the carrier 720. A portion of the caliper 740 may be secured to the carrier 720 and move to come into contact with the disk rotor 7320 of the disk 730. When the caliper 740 moves to come into contact with the disk rotor 7320 rotating with respect to the carrier 720, friction generated between the caliper 740 and the disk rotor 7320 may reduce a rotational speed of the disk rotor 7320 or stop the rotation of the disk rotor 7320.

The link 750 may be arranged to be connected to the carrier 720. One end of the link 750 may be connected to the carrier 720, and the other end thereof may be connected to the body. The link 750 may rotate with respect to the carrier 720 and the body. Since the link 750 rotates with respect to the carrier 720 and the body, the carrier 720 may move relative to the body. The link 750 may include a first link 751, a second link 752, and a third link 753.

The first link 751 may be disposed on an upper side (e.g., the +Z-axis direction) of the carrier 720. The second link 752 may be arranged on one portion (e.g., the +X-axis direction) of a lower side (e.g., the −Z-axis direction) of the carrier 720. The third link 753 may be arranged on another portion (e.g., the −X axis direction) of the lower side (e.g., the −Z axis direction) of the carrier 720.

The first link 751, the second link 752, and the third link 753 may be connected to the carrier 720 and rotate with respect to the carrier 720. According to an embodiment, one end of the first link 751, one end of the second link 752, and one end of the third link 753 may be connected to the carrier 720 and rotate with respect to the carrier 720, and the other end of the first link 751, the other end of the second link 752, and the other end of the third link 753 may be connected to the body and rotate with respect to the body. Since the first link 751, the second link 752, and the third link 753 rotate with respect to the carrier 720 and the body, the carrier 720 may move relative to the body.

The third link 753 may include an elastic support part 7531. The elastic support part 7531 may be arranged between the one end and the other end of the third link 753. An elastic element may be arranged on the elastic support part 7531, and the elastic element may be arranged to connect the third link 753 and a portion of the body. According to an embodiment, the elastic element may be provided as a spring. Since the elastic element connects the third link 753 and the portion of the body, the distance between the portion of the body and the third link 753 may change.

Figure 13:
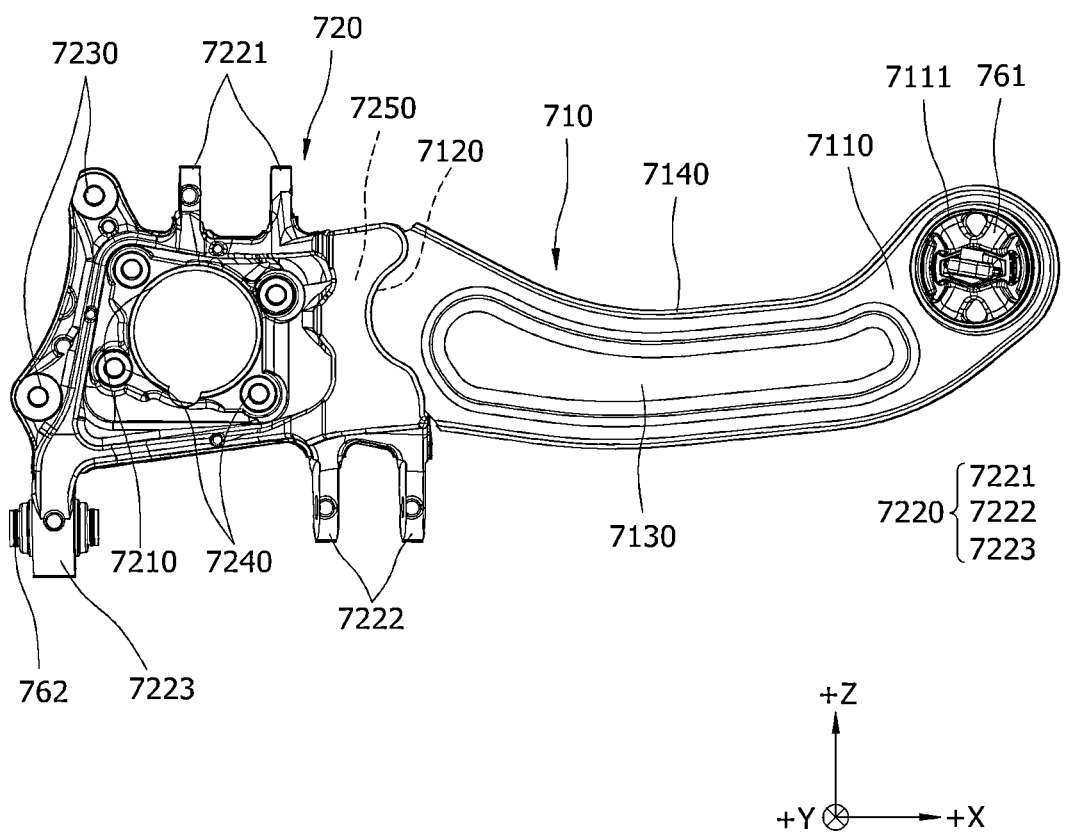
FIG. 13 is a plan view illustrating a portion of the suspension apparatus according to an embodiment of the present disclosure.
Figure 14:
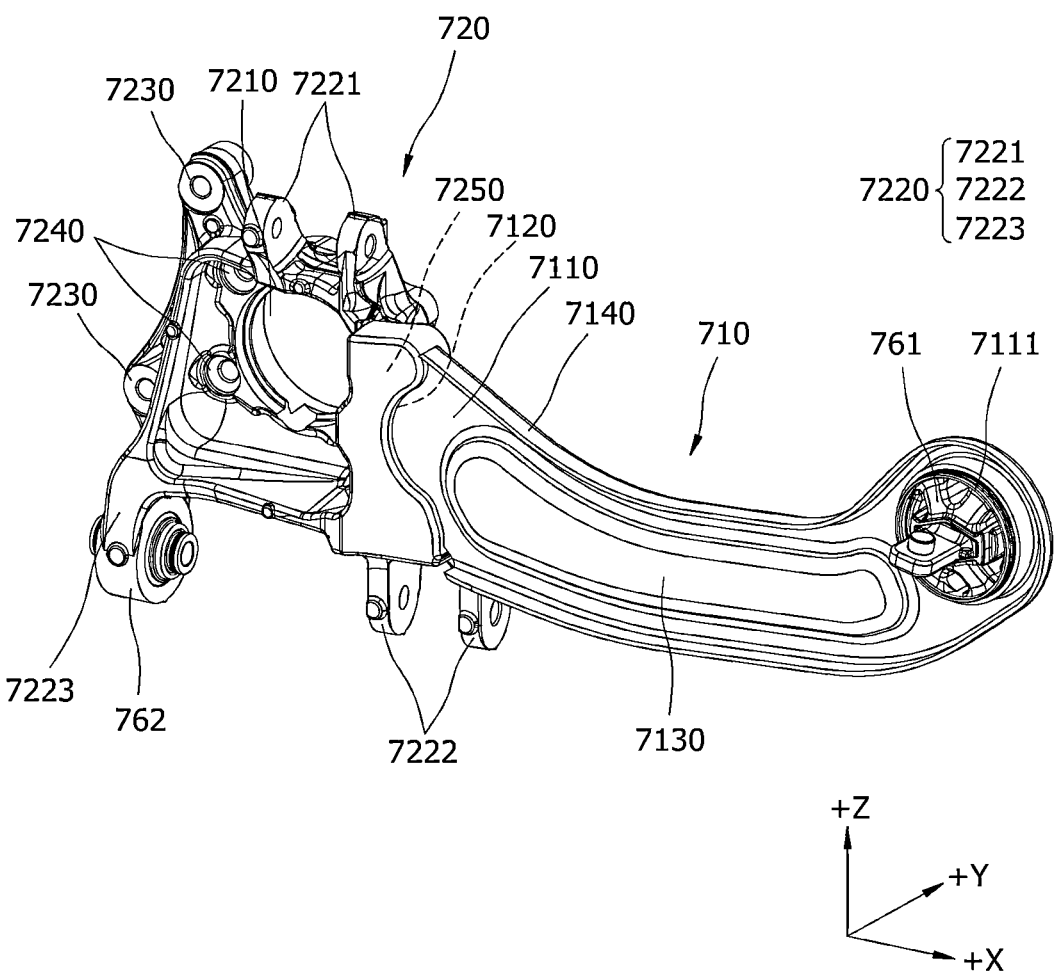
FIG. 14 is a perspective view illustrating the portion of the suspension apparatus according to an embodiment of the present disclosure, when viewed from one side.
Figure 15:
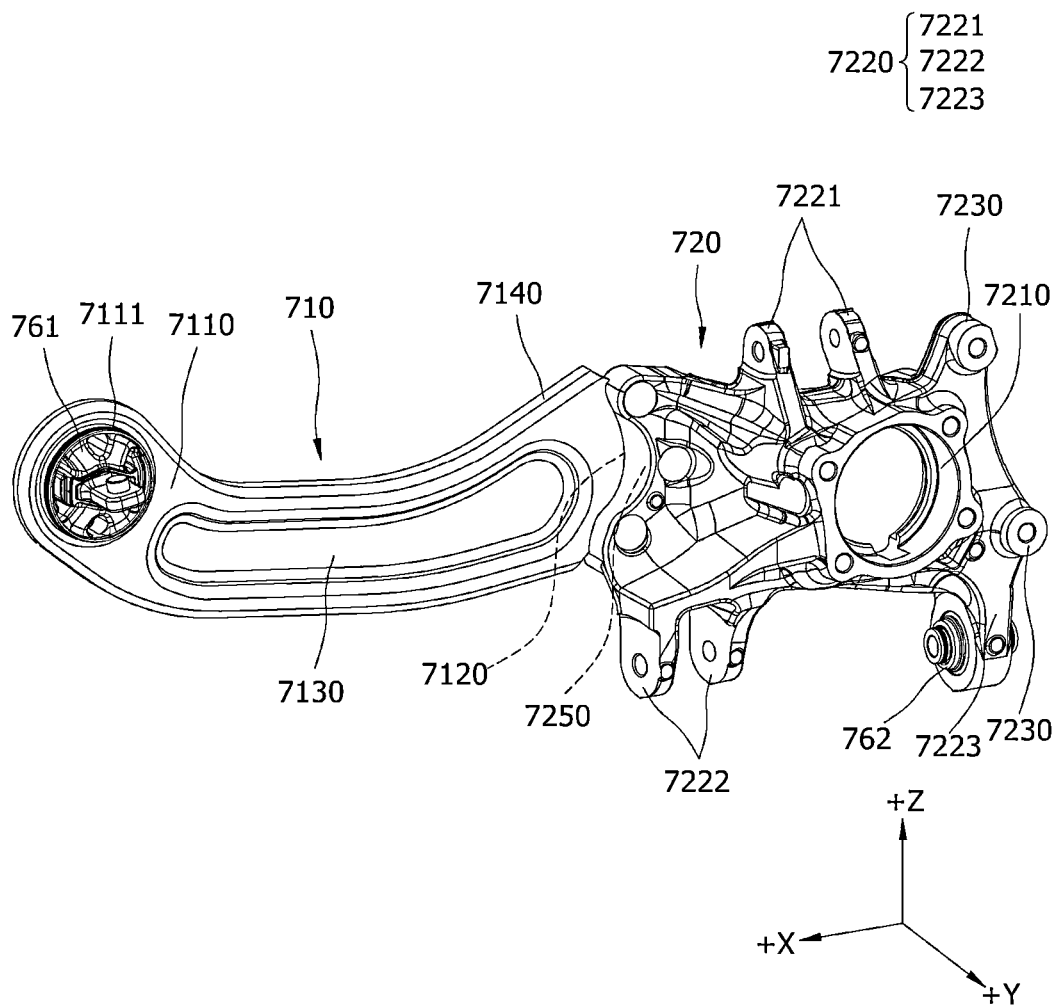
FIG. 15 is a perspective view illustrating the portion of the suspension apparatus according to an embodiment of the present disclosure, when viewed from the other side.
Figure 16:
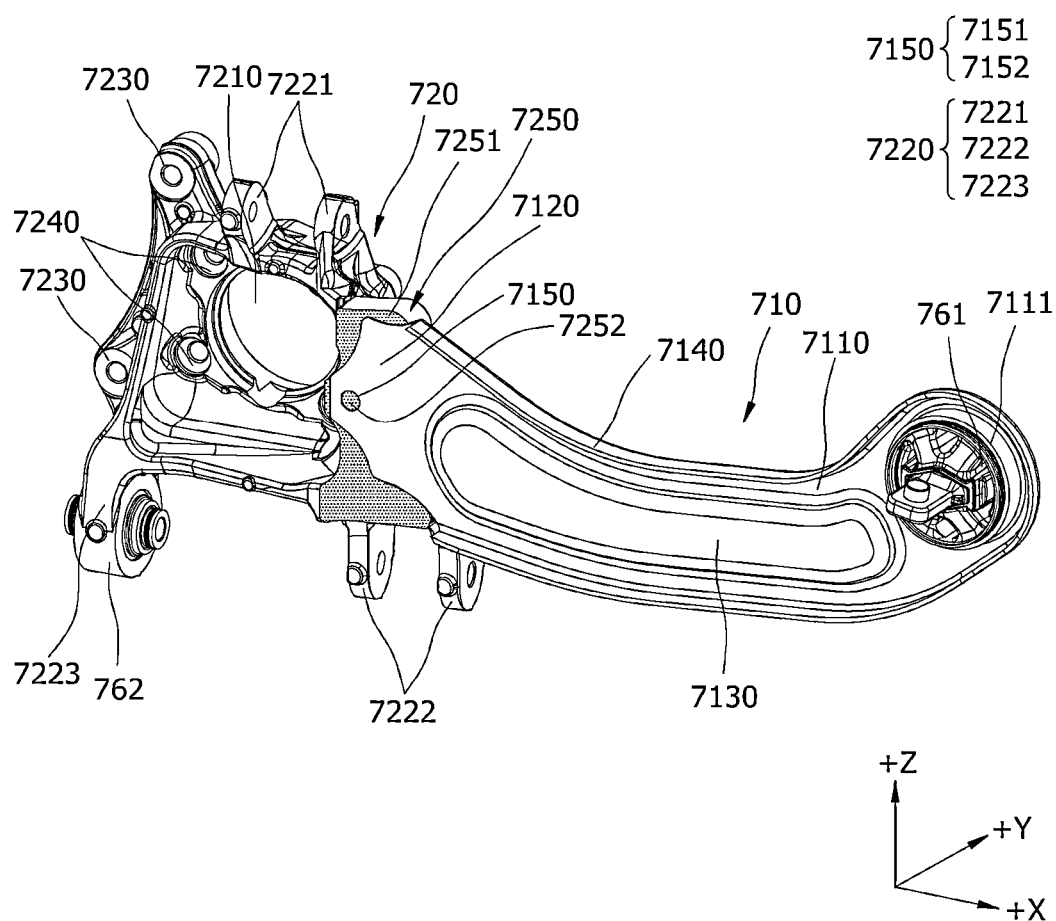
FIG. 16 is an enlarged perspective view illustrating the portion of the suspension apparatus according to an embodiment of the present disclosure.
Figure 17:
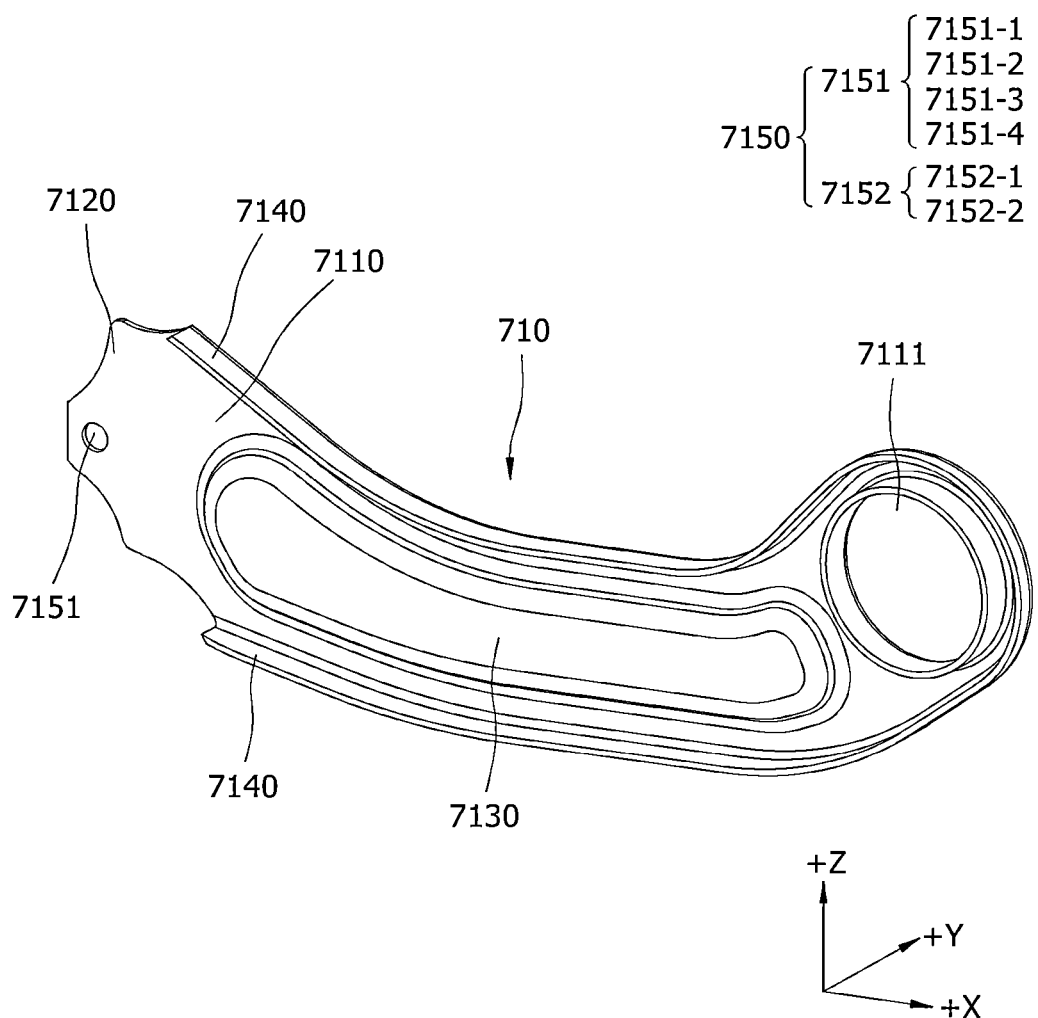
FIG. 17 is a perspective view illustrating a body connector of the suspension apparatus according to an embodiment of the present disclosure, when viewed from one side.
Figure 18:
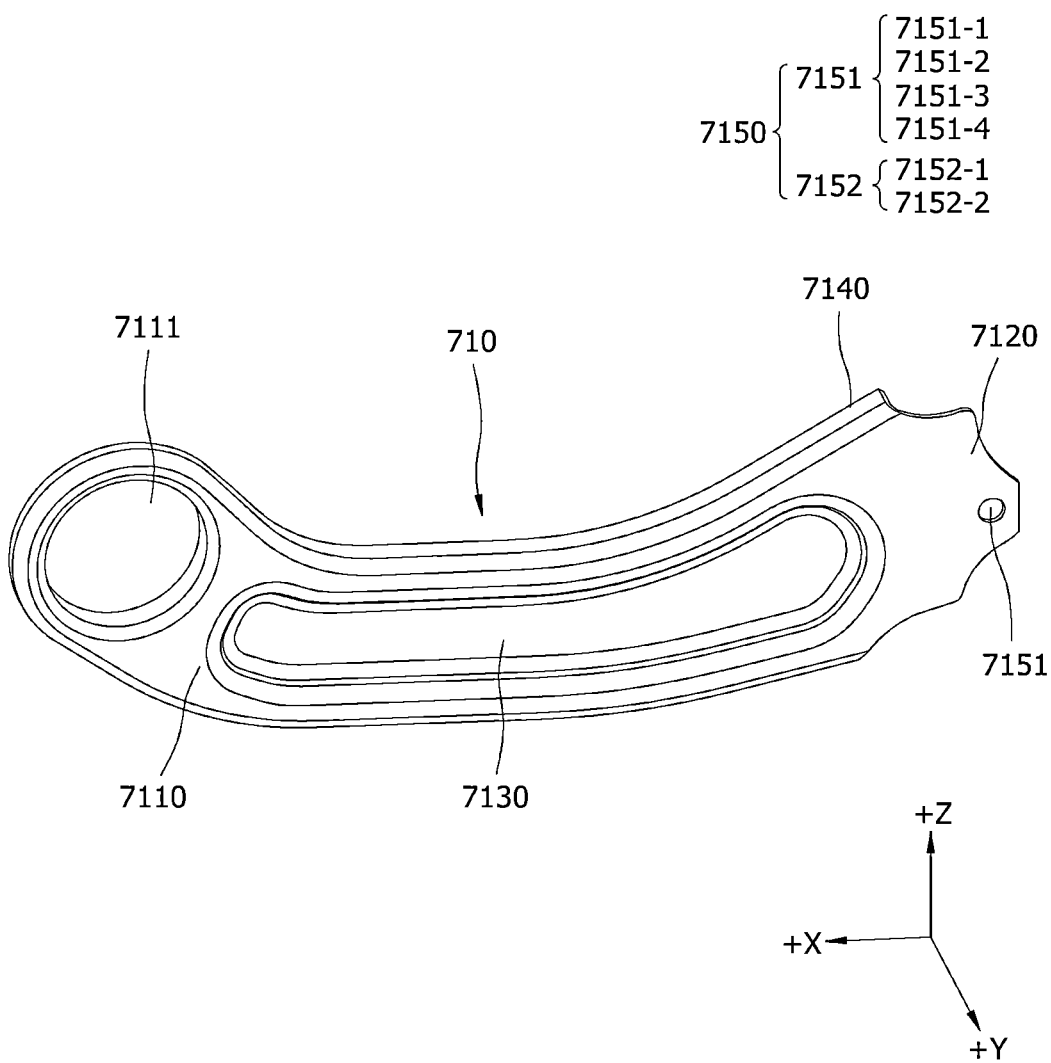
FIG. 18 is a perspective view illustrating the body connector of the suspension apparatus according to an embodiment of the present disclosure, when viewed from the other side.

FIG. 13 is a plan view illustrating a portion of the suspension apparatus according to an embodiment of the present disclosure. FIG. 14 is a perspective view illustrating the portion of the suspension apparatus according to an embodiment of the present disclosure, when viewed from one side. FIG. 15 is a perspective view illustrating the portion of the suspension apparatus according to an embodiment of the present disclosure, when viewed from the other side. FIG. 16 is an enlarged perspective view illustrating the portion of the suspension apparatus according to an embodiment of the present disclosure. FIG. 17 is a perspective view illustrating a body connector of the suspension apparatus according to an embodiment of the present disclosure, when viewed from one side. FIG. 18 is a perspective view illustrating the body connector of the suspension apparatus according to an embodiment of the present disclosure, when viewed from the other side.

The suspension apparatus 71, the body connector 710, the main body connector 7110, the body connection hole 7111, the carrier 720, the bush 760, the body connection bush 761, and a third link connection bush 762 illustrated in FIGS. 13 to 18 are the same as the suspension apparatus 71, the body connector 710, the main body connector 7110, the body connection hole 7111, the carrier 720, the bush 760, the body connection bush 761, and the third link connection bush 762 illustrated in FIGS. 11 and 12. Thus, the description of the same configuration may be omitted.

Referring to FIGS. 13 to 18, a detailed structure of the body connector 710 and the carrier 720 may be seen.

The body connector 710 may include a main body connector 7110, a body connection insertion portion 7120, a body recess portion 7130, a body bend portion 7140, and a coupling reinforcement portion 7150.

The main body connector 7110 may include the body connection hole 7111. The body connection hole 7111 may enable one side (e.g., the +Y-axis direction) and the other side (e.g., the −Y-axis direction) of the main body connector 7110 to communicate with each other. According to an embodiment, the body connection hole 7111 may be provided on one end of the main body connector 7110, and the body connection insertion portion 7120 may be provided on the other end of the main body connector 7110.

The bush 760 may be arranged in the body connection hole 7111. According to an embodiment, the body connection bush 761 may be arranged in the body connection hole 7111. The body connection bush 761 may be inserted into the body connection hole 7111 and may be connected to the body. The body connection bush 761 may be provided as an elastic element. Since the body connection bush 761 is inserted into the body connection hole 7111 and connected to the body, the main body connector 7110 provided with the body connection hole 7111 may rotate with respect to the body.

The body connection insertion portion 7120 may be provided in the main body connector 7110 to come into contact with the carrier 720. The body connection insert 7120 may be defined as a portion of the main body connector 7110 coming into contact with the carrier 720. According to an embodiment, the body connection insertion portion 7120 may be inserted into the carrier 720 such that the body connector 710 and the carrier 720 may be integrally provided. Since the body connector 710 and the carrier 720 are integrally provided, the coupling member connecting the body connector 710 and the carrier 720 may not be used.

The body recess portion 7130 may be provided in the main body connector 7110, and formed to be recessed toward one side (e.g., the −Y-axis direction). One or more body recess portions 7130 may be provided in the main body connector 7110. The body recess portion 7130 may be arranged in a central portion of the main body connector 7110. The location where the body recess portion 7130 is arranged is not limited to the central portion of the main body connector 7110, but the body recess portion 130 may be arranged at various locations. Since the body recess portion 7130 is provided in the main body connector 7110, the flexural rigidity of the body connector 710 may increase.

The body bend portion 7140 may be provided in the main body connector 7110 and bend toward one side (e.g., the −Y-axis direction). The body bend portion 7140 may be provided on an outer portion of the main body connector 7110. Since the body bend portion 7140 is provided in the main body connector 7110, the flexural rigidity of the body connector 710 may increase.

The coupling reinforcement portion 7150 may be arranged in the main body connector 7110. According to an embodiment, the coupling reinforcement portion 7150 may be arranged in the body connection insertion portion 7120. Since the coupling reinforcement portion 7150 is arranged in the body connection insertion portion 7120, the coupling reinforcement portion 7150 may come into contact with the carrier connector 7250 of the carrier 720.

The coupling reinforcement portion 7150 may be provided, in the form of a hole or protrusion, in the body connection insertion portion 7120, which may increase the contact area with the carrier connector 7250. Alternatively, a portion of the carrier connector 7250 may be arranged to penetrate the coupling reinforcement portion 7150, or may be arranged to surround the coupling reinforcement portion 7150.

Thus, the coupling strength between the coupling reinforcement portion 7150 and the carrier connector 7250 may be improved, resistance to a shear force generated by an external force, on the coupling reinforcement portion 7150 and the carrier connector 7250 may increase, and the rigidity of the suspension apparatus 71 may increase.

The coupling reinforcement portion 7150 may include a first coupling reinforcement portion 7151 and a second coupling reinforcement portion 7152. According to an embodiment, the first coupling reinforcement portion 7151 may be arranged to be formed on a surface of the body connection insertion portion 7120, and the second coupling reinforcement portion 7152 may be arranged to be formed on an end of the body connection insertion portion 7120. A description of the first coupling reinforcement portion 7151 will be described later with a description of FIGS. 19 to 22. A description of the second coupling reinforcement portion 7152 will be described later with a description of FIGS. 23 to 25.

The carrier 720 may include a carrier hole 7210, a link connector 7220, a caliper connector 7230, a disk connector 7240, and a carrier connector 7250.

The carrier 720 may be provided with a carrier hole 7210. The carrier hole 7210 may enable one side (e.g., the +Y-axis direction) and the other side (e.g., the −Y-axis direction) of the carrier 720 to communicate with each other. The disk 730 may be inserted into the carrier hole 7210. The disk 730 may be inserted into the carrier hole 7210 and secured to the carrier 720.

The carrier 720 may be provided with the link connector 7220. The link connector 7220 may connect the carrier 720 and the link 750. The link 750 may be provided to be connected to the carrier 720 through the link connector 7220 and rotate with respect to the carrier 720. The link connector 7220 may include a first link connector 7221, a second link connector 7222, and a third link connector 7223.

The first link connector 7221 may be provided in the carrier 720. According to an embodiment, the first link connector 7221 may be provided on an upper side (e.g., the +Z-axis direction) of the carrier 720. The first link connector 7221 may be provided with a hole into which the first link 751 may be inserted. The first link connector 7221 may be connected to the first link 751, and the first link 751 may rotate with respect to the carrier 720 by being connected to the first link connector 7221.

The second link connector 7222 may be provided in the carrier 720. According to an embodiment, the second link connector 7222 may be provided on one side (e.g., the +X-axis direction) of a lower side (e.g., the −Z-axis direction) of the carrier 720. The second link connector 7222 may be provided with a hole into which the second link 752 may be inserted. The second link connector 7222 may be connected to the second link 752, and the second link 752 may rotate with respect to the carrier 720 by being connected to the second link connector 7222.

The third link connector 7223 may be provided in the carrier 720. According to an embodiment, the third link connector 7223 may be provided on the other side (e.g., the −X-axis direction) of the lower side (e.g., the −Z-axis direction) of the carrier 720. The third link connector 7223 may be provided with a hole into which the third link 753 may be inserted. The third link connector 7223 may be connected to the third link 753, and the third link 753 may rotate with respect to the carrier 720 by being connected to the third link connector 7223.

The link connector 7220 may be provided with the bush 760. According to an embodiment, the third link connector 7223 may be provided with the third link connection bush 762. The third link connection bush 762 may be connected to the third link 753. The third link 753 may rotate with respect to the carrier 720 by being connected to the third link connection bush 762.

The caliper connector 7230 may be provided in the carrier 720. The caliper 740 may be connected to the caliper connector 7230. According to an embodiment, the caliper 740 may be secured to the caliper connector 7230, and the caliper 740, while moving relative to the disk rotor 7320 of the disk 730, may come into contact with and rub against the disk rotor 7320 or become spaced apart from the disk rotor 7320. Since the caliper 740 rubs against the disk 730, rotation of the disk 730 may slow down or stop.

The disk connector 7240 may be provided in the carrier 720. The disk connector 7240 may be arranged adjacent to the body connection hole 7111. The disk connector 7240 may be provided as a hole penetrating the carrier 720. The disk connector 7240 may be provided as one or more holes. The disk connector 7240 may be connected to the disk 730. According to an embodiment, a portion of the disk 730 may be secured to the carrier 720 by penetrating the disk connector 7240.

The carrier connector 7250 may be provided in the carrier 720. The carrier connector 7250 may be connected to the body connector 710. According to an embodiment, the body connector 710 may be inserted into the carrier connector 7250.

The body connector 710 may be made of a material including a first material. According to an embodiment, the first material may be provided as a material including at least one of iron, iron alloy, carbon fiber, and plastic, or a combination thereof.

The carrier 720 may be made of a material including a second material different from the first material. According to an embodiment, the second material may be provided as a material including at least one of aluminum, aluminum alloy, carbon fiber, and plastic, or a combination thereof.

With the body connector 710 provided, the carrier 720 integrally connected to the body connector 710 may be manufactured. Hereinafter, a manufacturing method of the suspension apparatus 71 provided with the body connector 710 and the carrier 720 will be described.

Figure 19:
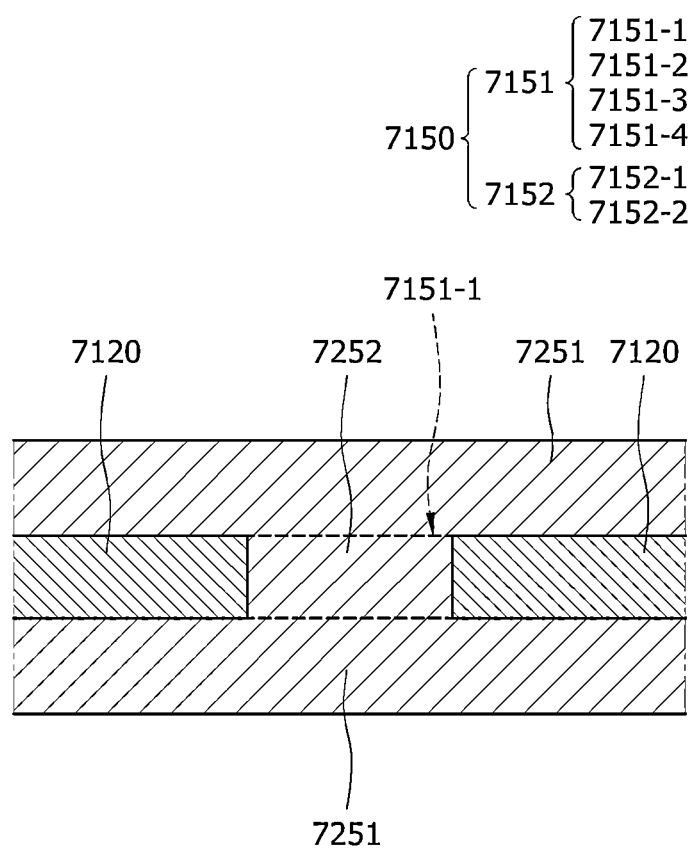
FIG. 19 is a cross-sectional view illustrating a first coupling reinforcement portion of the suspension apparatus according to a first embodiment of the present disclosure.
Figure 20:
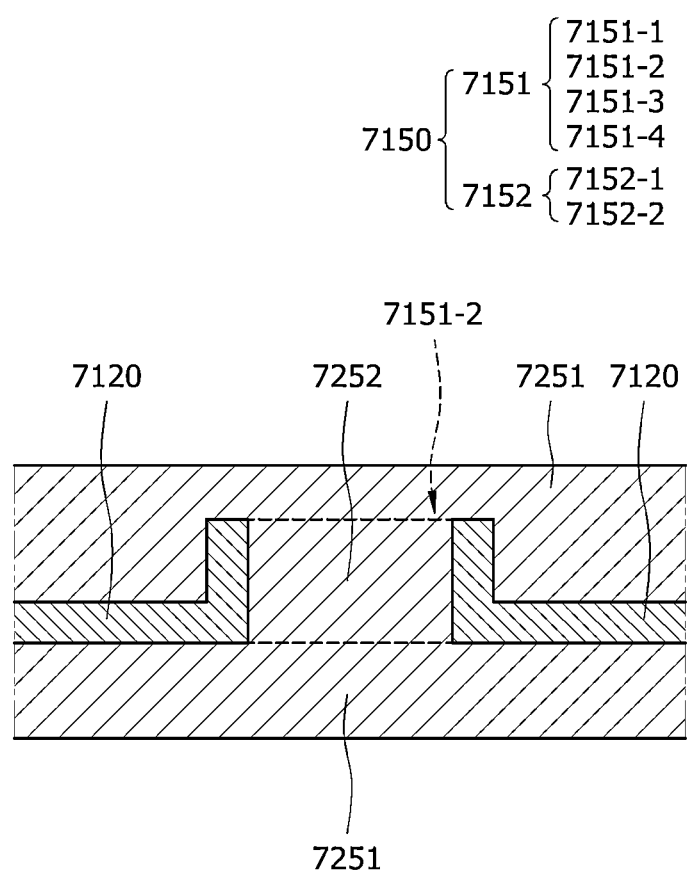
FIG. 20 is a cross-sectional view illustrating a first coupling reinforcement portion of the suspension apparatus according to a second embodiment of the present disclosure.
Figure 21:
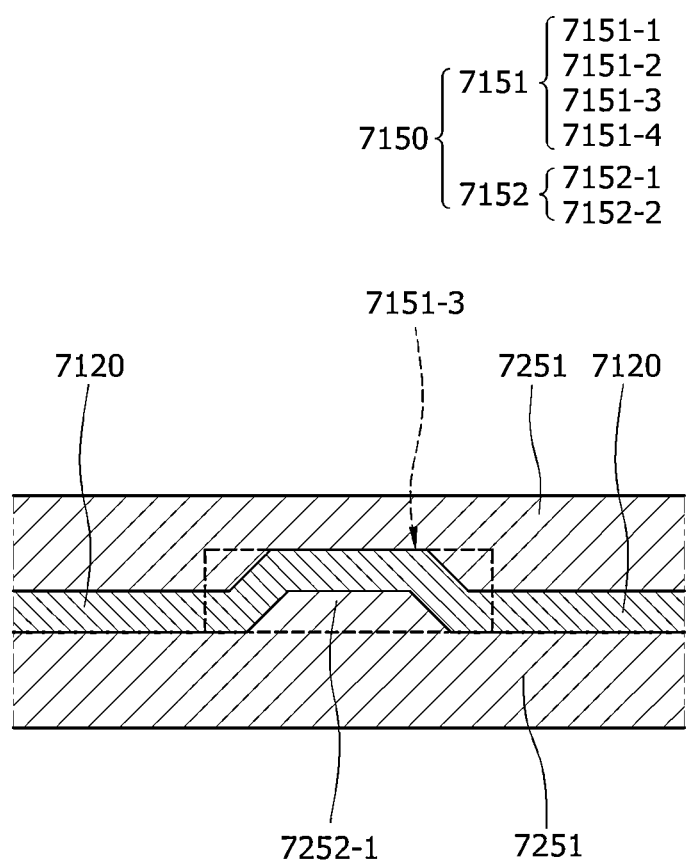
FIG. 21 is a cross-sectional view illustrating a first coupling reinforcement portion of the suspension apparatus according to a third embodiment of the present disclosure.
Figure 22:
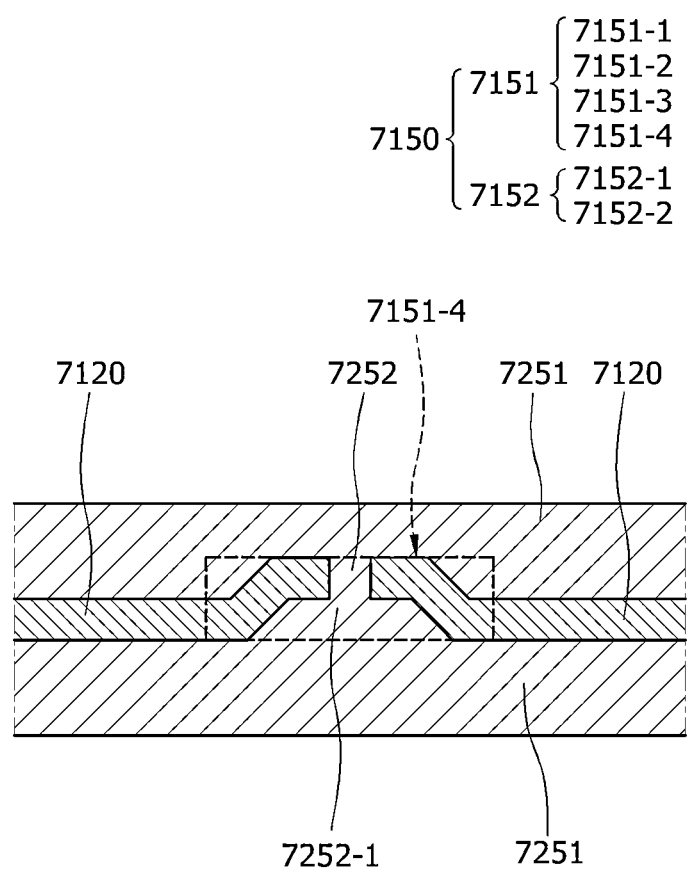
FIG. 22 is a cross-sectional view illustrating a first coupling reinforcement portion of the suspension apparatus according to a fourth embodiment of the present disclosure.

FIG. 19 is a cross-sectional view illustrating a first coupling reinforcement portion of the suspension apparatus according to a first embodiment of the present disclosure. FIG. 20 is a cross-sectional view illustrating a first coupling reinforcement portion of the suspension apparatus according to a second embodiment of the present disclosure. FIG. 21 is a cross-sectional view illustrating a first coupling reinforcement portion of the suspension apparatus according to a third embodiment of the present disclosure. FIG. 22 is a cross-sectional view illustrating a first coupling reinforcement portion of the suspension apparatus according to a fourth embodiment of the present disclosure.

The body connection insertion portion 7120, a first carrier connection member 7251, and a second carrier connection member 7252 illustrated in FIGS. 19 to 22 are the same as the body connection insertion portion 7120, the first carrier connection member 7251, and the second carrier connection member 7252 illustrated in FIGS. 11 to 18. Thus, the description of the same configuration may be omitted.

FIGS. 19 to 22 illustrate various embodiments of the first coupling reinforcement portion 7151.

Referring to FIG. 19, the first coupling reinforcement portion 7151 may be provided as a coupling reinforcement hole 7151-1. According to an embodiment, the coupling reinforcement hole 7151-1 may be provided as a hole penetrating the body connection insertion portion 7120. The coupling reinforcement hole 7151-1 is provided as a hole penetrating the body connection insertion portion 7120. The carrier connector 7250 may be inserted into the coupling reinforcement hole 7151-1. A plurality of the coupling reinforcement holes 7151-1 may be provided. The coupling reinforcement hole 7151-1 may vary in size, and the plurality of the coupling reinforcement holes 7151-1 may have different sizes.

The carrier connector 7250 may include the first carrier connection member 7251 and the second carrier connection member 7252.

The first carrier connection member 7251 may be arranged to come into contact with a surface of the body connection insertion portion 7120. According to an embodiment, the first carrier connection member 7251 may be arranged to come into contact with top and bottom surfaces of the body connection insertion portion 7120.

The second carrier connection member 7252 may be inserted into the coupling reinforcement hole 7151-1 and arranged to connect the first carrier connection member 7251. Since the second carrier connection member 7252 is inserted into the coupling reinforcement hole 7151-1, the contact area of the body connection insertion portion 7120 and the carrier connector 7250 may increase, and the coupling strength between the body connection insertion portion 7120 and the carrier connector 7250 may be improved. Thus, resistance to a shear force generated by an external force, between the body connection insertion portion 7120 and the carrier connector 7250 may increase, the rigidity of the suspension apparatus 71 may increase, and durability of the suspension apparatus 71 may be improved.

Referring to FIG. 20, the first coupling reinforcement portion 7151 may be provided as a coupling reinforcement burr 7151-2. According to an embodiment, the coupling reinforcement burr 7151-2 may be provided as a hole penetrating the body connection insertion portion 7120 and may be provided to extend from a surface of the body connection insertion portion 7120 and protrude in one direction. The coupling reinforcement burr 7151-2 may be provided to and protrude from a surface of the body connection insertion portion 7120 in one direction or the other direction. A plurality of the coupling reinforcement burrs 7151-2 may be provided. According to an embodiment, the plurality of the coupling reinforcement burrs 7151-2 may protrude from the surface of the body connection insertion portion 7120 in different directions.

The angle formed between the surface of the body connection insertion portion 7120 and the direction in which the coupling reinforcement burr 7151-2 protrudes may be, but is not limited to, above 0 degrees to below 180 degrees. According to an embodiment, the angle formed between the surface of the body connection insertion portion 7120 and the direction in which the coupling reinforcement burr 7151-2 protrudes may be approximately 90 degrees.

The plurality of the coupling reinforcement burrs 7151-2 may be provided. The size of the coupling reinforcement burrs 7151-2 and the protruding length of the coupling reinforcement burrs 7151-2 may vary.

The second carrier connection member 7252 may be inserted into the coupling reinforcement hole 7151-1 and arranged to connect the first carrier connection member 7251. Since the second carrier connection member 7252 is inserted into the coupling reinforcement burr 7151-2, the contact area of the body connection insertion portion 7120 and the carrier connector 7250 may increase, and the coupling strength between the body connection insertion portion 7120 and the carrier connector 7250 may be improved. Thus, resistance to a shear force generated by an external force, between the body connection insertion portion 7120 and the carrier connector 7250 may increase, the rigidity of the suspension apparatus 71 may increase, and durability of the suspension apparatus 71 may be improved.

Referring to FIG. 21, the first coupling reinforcement portion 7151 may be provided as a coupling reinforcement form unit 7151-3. The coupling reinforcement form unit 7151-3 may be provided to extend from a surface of the body connection insertion portion 7120. According to an embodiment, the coupling reinforcement form unit 7151-3 may be provided approximately in a square, trapezoidal, or embossed shape.

A plurality of the coupling reinforcement form units 7151-3 may be provided. The plurality of the coupling reinforcement form units 7151-3 may protrude in different directions.

The angle formed between the surface of the body connection insertion portion 7120 and the direction in which the coupling reinforcement form units 7151-3 protrudes may be, but is not limited to, above 0 degrees to below 180 degrees. According to an embodiment, the angle formed between the surface of the body connection insertion portion 7120 and the direction in which the coupling reinforcement form unit 7151-3 protrudes may be approximately 45 degrees.

A space formed to be recessed may be provided on the opposite side of the direction in which the coupling reinforcement form unit 7151-3 protrudes. A third carrier connection member 7252-1 may be arranged in the space, which is recessed with respect to the coupling reinforcement form unit 7151-3. Since the coupling reinforcement form unit 7151-3 may be provided to extend from a surface of the body connection insertion portion 7120, the contact area of the body connection insertion portion 7120 and the carrier connector 7250 may increase, and the coupling strength between the body connection insertion portion 7120 and the carrier connector 7250 may be improved.

Referring to FIG. 22, the first coupling reinforcement portion 7151 may be provided as a coupling reinforcement form unit hole 7151-4. The coupling reinforcement form unit hole 7151-4 may be provided to extend from a surface of the body connection insertion portion 7120. According to an embodiment, the coupling reinforcement form unit hole 7151-4 may be provided approximately in a square, trapezoidal, or embossed shape.

The coupling reinforcement form unit hole 7151-4 may be provided in the form of a combination of the coupling reinforcement form unit 7151-3 and the coupling reinforcement hole 7151-1.

A plurality of the coupling reinforcement form unit holes 7151-4 may be provided. The plurality of the coupling reinforcement form unit holes 7151-4 may protrude in different directions.

A space formed to be recessed may be provided on the opposite side of the direction in which the coupling reinforcement form unit hole 7151-4 protrudes. A third carrier connection member 7252-1 may be arranged in the space formed to be recessed of the coupling reinforcement form unit hole 7151-4. The coupling reinforcement form unit hole 7151-4 is provided to extend from a surface of the body connection insertion portion 7120, and the second carrier connection member 7252 is arranged to penetrate the coupling reinforcement form unit hole 7151-4. Thus, the contact area of the body connection insertion portion 7120 and the carrier connector 7250 may increase, and the coupling strength between the body connection insertion portion 7120 and the carrier connector 7250 may be improved.

Figure 23:
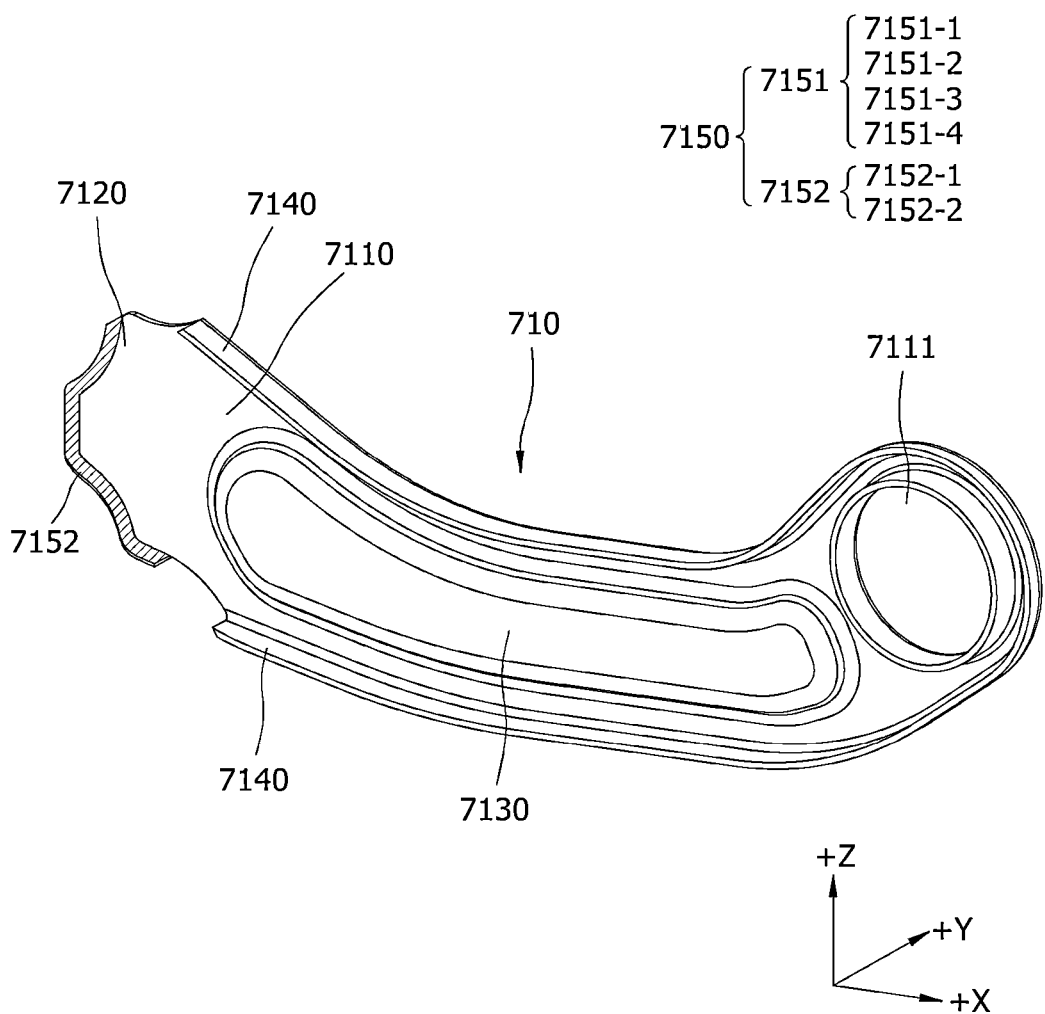
FIG. 23 is a perspective view illustrating a body connector of the suspension apparatus according to an embodiment of the present disclosure, when viewed from the other side.
Figure 24:
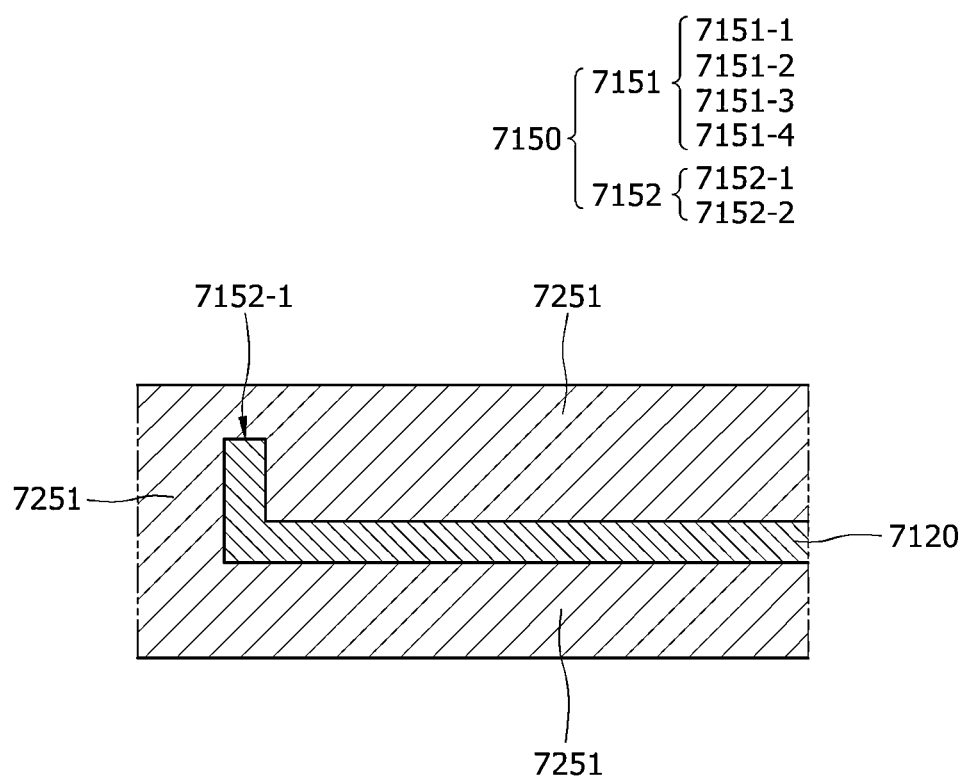
FIG. 24 is a cross-sectional view illustrating an end of a second coupling reinforcement portion of the suspension apparatus according to the first embodiment of the present disclosure.
Figure 25:
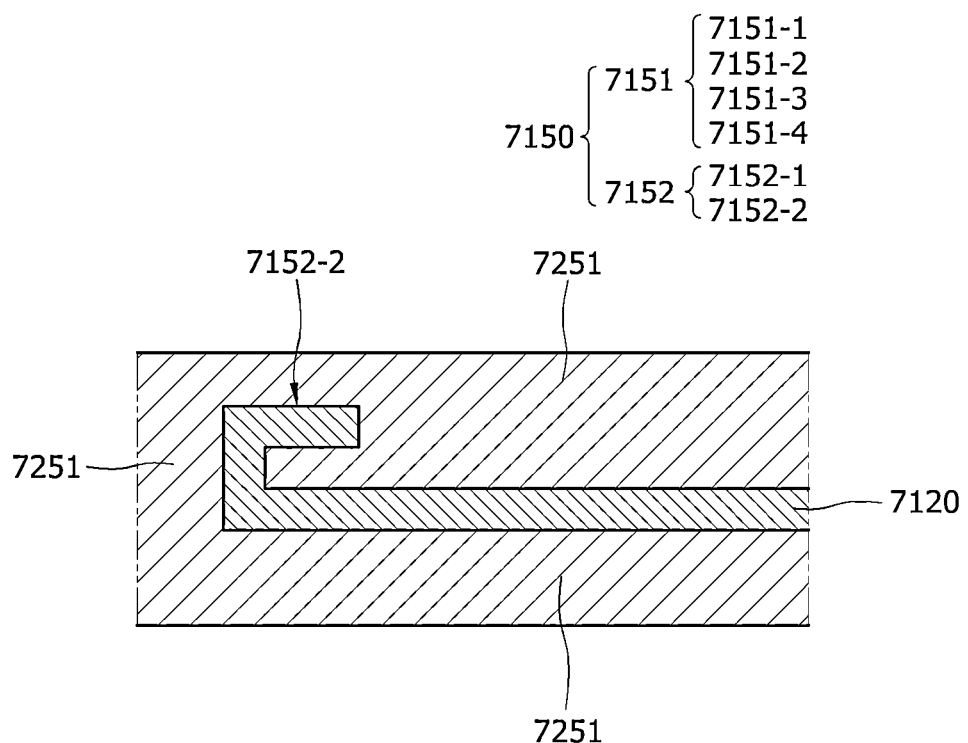
FIG. 25 is a cross-sectional view illustrating an end of a second coupling reinforcement portion of the suspension apparatus according to the second embodiment of the present disclosure.

FIG. 23 is a perspective view illustrating the body connector of the suspension apparatus according to an embodiment of the present disclosure, when viewed from the other side. FIG. 24 is a cross-sectional view illustrating an end of a second coupling reinforcement portion of the suspension apparatus according to the first embodiment of the present disclosure. FIG. 25 is a cross-sectional view illustrating an end of a second coupling reinforcement portion of the suspension apparatus according to the second embodiment of the present disclosure.

The body connector 710, the main body connector 7110, the body connection insertion portion 7120, the first carrier connection member 7251, and the second carrier connection member 7252 illustrated in FIGS. 23 to 25 are the same as the body connector 710, the main body connector 7110, the body connection insertion portion 7120, the first carrier connection member 7251, and the second carrier connection member 7252 illustrated in FIGS. 11 to 22. Thus, the description of the same configuration may be omitted.

FIGS. 23 to 25 illustrate various embodiments of the second coupling reinforcement portion 7152.

Referring to FIG. 23, the second coupling reinforcement portion 7152 may be arranged on an end of the body connection insertion portion 7120. According to an embodiment, the body connection hole 7111 may be arranged on one side of the body connection insertion portion 7120, and the second coupling reinforcement portion 7152 may be arranged on the other side of the body connection insertion portion 7120.

The second coupling reinforcement portion 7152 may extend from the body connection insertion portion 7120. The angle formed between the direction in which the second coupling reinforcement portion 7152 extends and the surface of the body connection insertion portion 7120 may be approximately above 0 degrees to below 180 degrees. Since the second coupling reinforcement portion 7152 is arranged to extend from the body connection insertion portion 7120, the contact area of the body connector 710 and the carrier 720 may increase, and the coupling strength therebetween may be improved. In addition, a shear force generated by an external force may increase, and the rigidity and durability of the suspension apparatus 71 may be improved.

Referring to FIG. 24, the second coupling reinforcement portion 7152 may be provided as a coupling reinforcement flange 7152-1. The coupling reinforcement flange 7152-1 may be provided to extend from an end of the body connection insertion portion 7120. The coupling reinforcement flange 7152-1 may be provided to bend from the body connection insertion portion 7120. According to an embodiment, the coupling reinforcement flange 7152-1 and the body connection insertion portion 7120 may form approximately an "L" shape in the alphabet. Since the coupling reinforcement flange 7152-1 and the body connection insertion portion 7120 form approximately an "L" shape in the alphabet, the first carrier connection member 7251 may be arranged to surround the coupling reinforcement flange 7152-1. Thus, the contact area of the body connector 710 and the carrier 720 may increase, and the coupling strength therebetween may be improved. In addition, a shear force generated by an external force may increase, and the rigidity and durability of the suspension apparatus 71 may be improved.

Referring to FIG. 25, the second coupling reinforcement portion 7152 may be provided as a coupling reinforcement hem 7152-2. The coupling reinforcement hem 7152-2 may be provided to extend from an end of the body connection insertion portion 7120. The coupling reinforcement hem 7152-2 may be provided to bend from the body connection insertion portion 7120. According to an embodiment, the coupling reinforcement hem 7152-2 and the body connection insertion portion 7120 may form approximately a "C" shape in the alphabet. Since the coupling reinforcement hem 7152-2 and the body connection insertion portion 7120 form approximately a "C" shape in the alphabet, the first carrier connection member 7251 may be arranged to surround the coupling reinforcement hem 7152-2. Thus, the contact area of the body connector 710 and the carrier 720 may increase, and the coupling strength therebetween may be improved. In addition, a shear force generated by an external force may increase, and the rigidity and durability of the suspension apparatus 71 may be improved.

Figure 26:
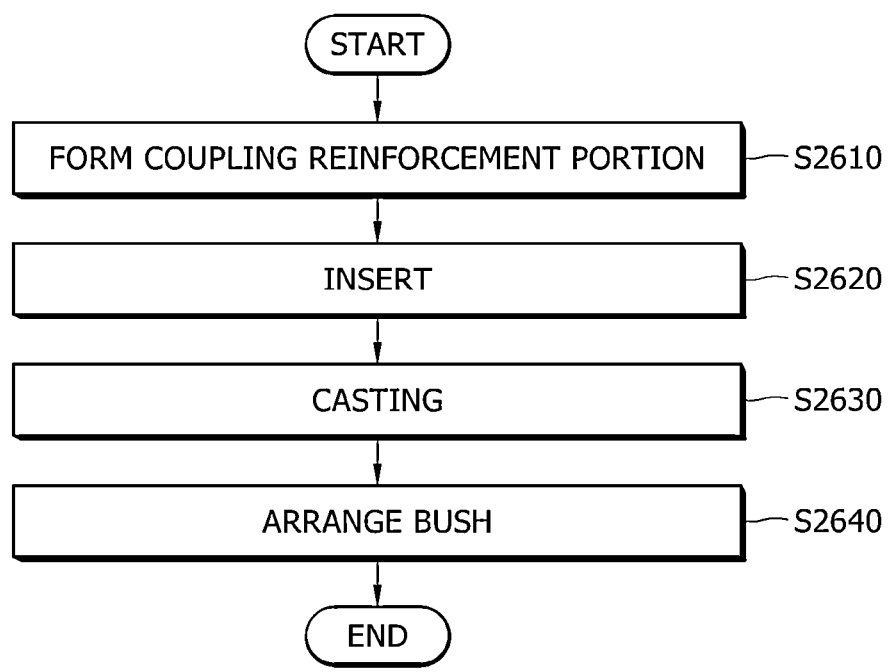
FIG. 26 is a flowchart illustrating a manufacturing method of the suspension apparatus according to an embodiment of the present disclosure.
Figure 27:
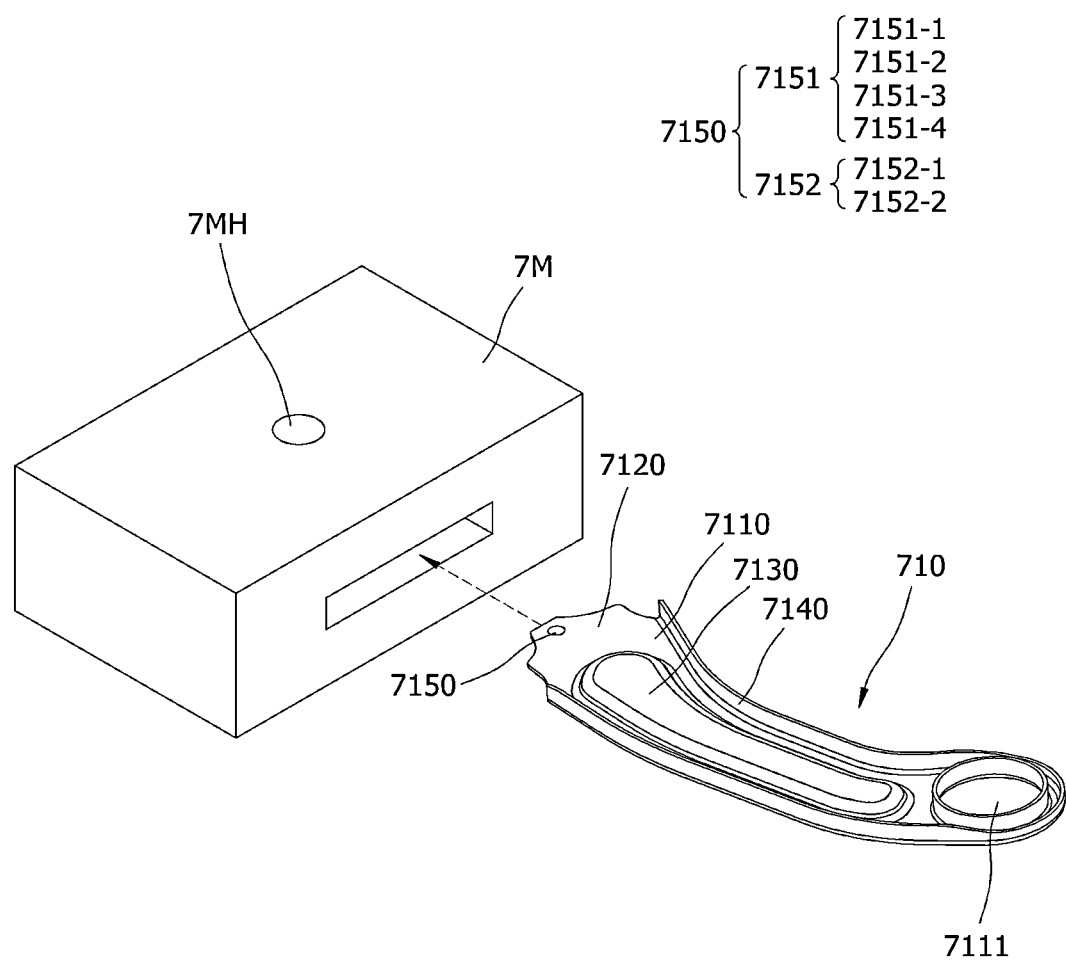
FIG. 27 is a perspective view illustrating an insertion of the body connector of the suspension apparatus into a mold according to an embodiment of the present disclosure.

FIG. 26 is a flowchart illustrating a manufacturing method of the suspension apparatus according to an embodiment of the present disclosure. FIG. 27 is a perspective view illustrating an insertion of the body connection part of the suspension apparatus into a mold according to an embodiment of the present disclosure.

The body connector 710, the main body connector 7110, the body connection hole 7111, the body connection insertion portion 7120, the body recess portion 7130, the body bend portion 7140, the coupling reinforcement portion 7150, and the carrier 720 used in the description of FIGS. 26 and 27 are the same as the body connector 710, the main body connector 7110, the body connection hole 7111, the body connection insertion portion 7120, the body recess portion 7130, the body bend portion 7140, the coupling reinforcement portion 7150, and the carrier 720 illustrated in FIGS. 11 to 25. Thus, the description of the same configuration may be omitted.

Referring to FIGS. 26 and 27, the manufacturing method of the suspension apparatus 1 may include a step of forming a coupling reinforcement portion in which the coupling reinforcement portion 7150 is formed in the main body connector 7110 (S2610 in FIG. 26). According to an embodiment, the coupling reinforcement portion 7150 may be formed in the body connection insertion portion 7120. The coupling reinforcement portion 7150 may be formed in the body connection insertion portion 7120 to enhance the coupling strength between the body connector 710 and the carrier 720. Thus, resistance to a shear force generated by an external force, between the body connector 710 and the carrier 720 may increase. The coupling reinforcement portion 7150 may include the first coupling reinforcement portion 7151 and/or the second coupling reinforcement portion 7152.

The step of forming a coupling reinforcement portion (S2610) may include forming the first coupling reinforcement portion 7151 on a surface of the body connection insertion portion 7120. The first coupling reinforcement portion 7151 may be formed on the surface of the body connection insertion portion 7120 to increase the contact area of the body connector 710 and the carrier 720. The first coupling reinforcement portion 7151 may be formed in various ways, such as drilling, milling, burring, extrusion, and the like.

The first coupling reinforcement portion 7151 may include the coupling reinforcement hole 7151-1, the coupling reinforcement burr 7151-2, the coupling reinforcement form unit 7151-3, and/or the coupling reinforcement form unit hole 7151-4.

The coupling reinforcement hole 7151-1 may be provided to penetrate the body connection insertion portion 7120. A plurality of the coupling reinforcement holes 7151-1 may be provided. The shape, size, and number of the coupling reinforcement holes 7151-1 may vary.

The coupling reinforcement burr 7151-2 may be provided as a hole penetrating the body connection insertion portion 7120, and may be provided to protrude in one direction with respect to the body connection insertion portion 7120. The plurality of the coupling reinforcement burrs 7151-2 may be provided. The shape, size, number, and protruding direction of the coupling reinforcement burrs 7151-2 may vary.

The coupling reinforcement form unit 7151-3 may protrude from the body connection insertion portion 7120. The direction in which the coupling reinforcement form unit 7151-3 protrudes may form a predetermined angle with a surface of the body connection insertion portion 7120. Thus, the coupling reinforcement form unit 7151-3 may be provided to be inclined with respect to the body connection insertion portion 7120. The plurality of the coupling reinforcement form units 7151-3 may be provided. The shape, size, and number of the coupling reinforcement form units 7151-3 may vary.

The coupling reinforcement form unit hole 7151-4 may be provided as a hole penetrating the body connection insertion portion 7120, and may be provided to protrude in one direction with respect to the body connection insertion portion 7120. The plurality of the coupling reinforcement form unit holes 7151-4 may be provided. The shape, size, number, and protruding direction of the coupling reinforcement form unit holes 7151-4 may vary.

The step of forming a coupling reinforcement portion (S2610) may include forming the second coupling reinforcement portion 7152 on an end of the body connection insertion portion 7120. The second coupling reinforcement portion 7152 may be formed on an end of the body connection insertion portion 7120 to increase the contact area of the body connector 710 and the carrier 720. The second coupling reinforcement portion 7152 may be formed in various ways, such as extrusion, and the like.

The second coupling reinforcement portion 7152 may include the coupling reinforcement flange 7152-1 and/or the coupling reinforcement hem 7152-2.

The coupling reinforcement flange 7152-1 may extend from the body connection insertion portion 7120 and bend in one direction. The angle formed between the coupling reinforcement flange 7152-1 and the body connection insertion portion 7120 may be approximately above 0 degrees to below 180 degrees. According to an embodiment, the angle formed between the coupling reinforcement flange 7152-1 and the body connection insertion portion 7120 may be approximately 90 degrees. The coupling reinforcement flange 7152-1 and the body connection insertion portion 7120 may form approximately an "L" shape. The length, protruding height, and placement location of the coupling reinforcement flange 7152-1 may vary.

The coupling reinforcement hem 7152-2 may extend from the body connection insertion portion 7120 and bend in one direction. The angle formed between the coupling reinforcement hem 7152-2 and the body connection insertion portion 7120 may be approximately above 0 degrees to below 180 degrees. According to an embodiment, The angle formed between the coupling reinforcement hem 7152-2 and the body connection insertion portion 7120 may be approximately 90 degrees. The coupling reinforcement hem 7152-2 may be bent at two points. Thus, the coupling reinforcement hem 7152-2 and the body connection insertion portion 7120 may form approximately a "C" shape. The length, protruding height, and placement location of the coupling reinforcement hem 7152-2 may vary.

The manufacturing method of the suspension apparatus 71 may include an insertion step in which the body connector 710 is arranged in a mold 7M (S2620 in FIG. 26). The body connector 710 may be made of a material including a first material. The body connection insertion portion 7120 of the body connector 710 may be inserted into the mold 7M. Since the body connection insertion portion 7120 is inserted into the mold 7M, the body connection insertion portion 7120 may come into contact with the material including the second material in a casting step (S2630 in FIG. 26), which will be described below.

The manufacturing method of the suspension apparatus 71 may include the casting step in which the material including the second material is disposed in the mold 7M to form the carrier 720 (S2630 in FIG. 26). The material including the second material may be injected into the mold 7M through a mold hole 7MH of the mold 7M. The first material of the body connector 710 and the second material of the carrier 720 may be different from each other. The mold 7M may be provided to correspond to a shape of the carrier 720.

In the casting step (S2630), the body connection insertion portion 7120 provided in the body connector 710 may be connected to the carrier connector 7250 of the carrier 720. According to an embodiment, the body connection insertion portion 7120 may be inserted into the carrier connector 7250. When the body connection insertion portion 7120 is inserted into the carrier connector 7250, the coupling strength may be generated between the body connection insertion portion 7120 and the carrier connector 7250, resulting in the body connector 710 and the carrier 720 being integrally formed. Since the body connector 710 and the carrier 720 may be integrally formed, the coupling member (e.g., bolt, nut, etc.) coupling the body connector 710 and the carrier 720 may not be used. Thus, the mass of the suspension apparatus 71 may be reduced, and a process for coupling the body connector 710 and the carrier 720 is not required, resulting in lower manufacturing cost of the suspension apparatus 71.

The manufacturing method of the suspension apparatus 71 may include a bush arrangement step in which the bush 760 is arranged in the suspension apparatus 71 (S2640 in FIG. 26). The bush 760 may include the body connection bush 761 and the third link connection bush 762.

The bush arrangement step (S2640) may include arranging the body connection bush 761 in the body connection hole 7111. According to an embodiment, the bush arrangement step (S2640) may include inserting the body connection bush 761 into the body connection hole 7111.

The bush arrangement step (S2640) may include arranging the third link connection bush 762 in the third link connector 7223. According to an embodiment, the bush arrangement step (S2640) may include inserting the third link connection bush 762 into the third link connector 7223.

The suspension apparatus 71 manufactured by the manufacturing method of the suspension apparatus may be made lightweight, thereby improving ride comport. In addition, a tolerance occurring in the suspension apparatus 71 may be minimized, and rigidity may increase. Furthermore, the manufacturing cost of the suspension apparatus 71 may be lowered.

Although the present disclosure has been described with reference to the embodiments illustrated in the drawings, the embodiments are for illustrative purposes only, and those skilled in the art will appreciate that various modifications and other equivalent embodiments are possible from the embodiments. In addition, the disclosure may also be used in other fields. Thus, the true technical scope of the present disclosure should be defined by the following claims.

What is claimed is:

1. A suspension apparatus comprising:
a body connector including:
a main body connector provided with a body connection insertion portion; and
a coupling reinforcement portion arranged on the body connection insertion portion; and
a carrier including:
a carrier connector to which the body connection insertion portion is inserted and which comes into contact with the coupling reinforcement portion;
a carrier hole into which a wheel bearing is inserted;
a caliper connector connected to a caliper; and
a link connector connected to a link,
wherein the coupling reinforcement portion comprises a first coupling reinforcement portion, which is formed on a surface of the body connection insertion portion and configured to enhance the coupling strength between the body connection insertion portion and the carrier connector,
wherein the first coupling reinforcement portion comprises a coupling reinforcement form device configured to protrude in one direction and be inclined with respect to the body connection insertion portion, and
wherein the carrier connector comprises:
a first carrier connection member configured to come in contact with the coupling reinforcement form device; and
a second carrier connection member seated on the coupling reinforcement form device.

2. The suspension apparatus of claim 1,
wherein the first coupling reinforcement portion comprises a coupling reinforcement hole configured to receive the body connection insertion portion, and
wherein the carrier connector comprises:
a first carrier connection member configured to come in contact with the coupling reinforcement hole; and
a third carrier connection member configured to penetrate the coupling reinforcement hole.

3. The suspension apparatus of claim 1,
wherein the first coupling reinforcement portion comprises a coupling reinforcement burr penetrating the body connection insertion portion and protruding in one direction with respect to the body connection insertion portion, and
wherein the carrier connector comprises:
a first carrier connection member configured to come in contact with the coupling reinforcement burr; and
the third carrier connection member configured to penetrate the coupling reinforcement burr.

4. The suspension apparatus of claim 1, further comprising:
a second coupling reinforcement portion formed on an end of the body connection insertion portion to enhance the coupling strength between the body connection insertion portion and the carrier connector.

5. The suspension apparatus of claim 4,
wherein the second coupling reinforcement portion comprises a coupling reinforcement flange extending from an end of the body connection insertion portion and configured to bend in one direction, and
wherein the carrier connector comprises a first carrier connection member configured to surround the coupling reinforcement flange.

6. A suspension apparatus comprising:
a body connector including:
a main body connector provided with a body connection insertion portion; and
a coupling reinforcement portion arranged on the body connection insertion portion; and
a carrier including:
a carrier connector to which the body connection insertion portion is inserted and which comes into contact with the coupling reinforcement portion;
a carrier hole into which a wheel bearing is inserted;

a caliper connector connected to a caliper; and
a link connector connected to a link,
wherein the coupling reinforcement portion comprises a first coupling reinforcement portion, which is formed on a surface of the body connection insertion portion and configured to enhance the coupling strength between the body connection insertion portion and the carrier connector, and
wherein the first coupling reinforcement portion comprises a coupling reinforcement form device configured to protrude in one direction and be inclined with respect to the body connection insertion portion, and provided with a hole, and
wherein the carrier connector comprises:
   a first carrier connection member configured to come in contact with the coupling reinforcement form device hole; and
   a second carrier connection member configured to penetrate the coupling reinforcement form device hole.

7. The suspension apparatus of claim 6,
wherein the first coupling reinforcement portion comprises a coupling reinforcement hole configured to receive the body connection insertion portion, and
wherein the carrier connector comprises:
   a first carrier connection member configured to come in contact with the coupling reinforcement hole; and
   the second carrier connection member configured to penetrate the coupling reinforcement hole.

8. The suspension apparatus of claim 6,
wherein the first coupling reinforcement portion comprises a coupling reinforcement burr penetrating the body connection insertion portion and protruding in one direction with respect to the body connection insertion portion, and
wherein the carrier connector comprises:
   a first carrier connection member configured to come in contact with the coupling reinforcement burr; and
   the second carrier connection member configured to penetrate the coupling reinforcement burr.

9. The suspension apparatus of claim 6, further comprising:
   a second coupling reinforcement portion formed on an end of the body connection insertion portion to enhance the coupling strength between the body connection insertion portion and the carrier connector.

10. The suspension apparatus of claim 9,
wherein the second coupling reinforcement portion comprises a coupling reinforcement flange extending from an end of the body connection insertion portion and configured to bend in one direction, and
wherein the carrier connector comprises a first carrier connection member configured to surround the coupling reinforcement flange.

\* \* \* \* \*